(12) United States Patent
Akiyama et al.

(10) Patent No.: US 8,879,925 B2
(45) Date of Patent: Nov. 4, 2014

(54) OPTICAL TRANSMITTER AND OPTICAL TRANSMISSION METHOD

(75) Inventors: Yuichi Akiyama, Kawasaki (JP); Takeshi Hoshida, Kawasaki (JP)

(73) Assignee: Fujitsu Limited, Kawaski (JP)

( * ) Notice: Subject to any disclaimer, the term of this patent is extended or adjusted under 35 U.S.C. 154(b) by 35 days.

(21) Appl. No.: 13/314,590

(22) Filed: Dec. 8, 2011

(65) Prior Publication Data

US 2012/0148260 A1 Jun. 14, 2012

(30) Foreign Application Priority Data

Dec. 13, 2010 (JP) ................................ 2010-276938

(51) Int. Cl.
*H04B 10/00* (2013.01)
*H04B 10/50* (2013.01)
*H04B 10/588* (2013.01)

(52) U.S. Cl.
CPC ............ *H04B 10/505* (2013.01); *H04B 10/588* (2013.01)
USPC ............ 398/193; 398/184; 398/192; 398/197

(58) Field of Classification Search
CPC ........................................ H04B 10/50–10/588
USPC .................................................. 398/182–201
See application file for complete search history.

(56) References Cited

U.S. PATENT DOCUMENTS

| | | | | |
|---|---|---|---|---|
| 5,481,389 A * | 1/1996 | Pidgeon et al. | ................ | 398/208 |
| 5,631,758 A * | 5/1997 | Knox et al. | ................ | 398/75 |
| RE36,715 E * | 5/2000 | Taylor | ................ | 398/184 |
| 6,118,566 A * | 9/2000 | Price | ................ | 398/194 |
| 6,850,713 B2 * | 2/2005 | Kikuchi et al. | ................ | 398/201 |
| 6,865,348 B2 * | 3/2005 | Miyamoto et al. | ................ | 398/183 |
| 7,194,211 B2 * | 3/2007 | Schemmann et al. | ................ | 398/183 |
| 7,272,271 B2 * | 9/2007 | Kaplan et al. | ................ | 385/3 |
| 7,321,734 B2 * | 1/2008 | Roberts et al. | ................ | 398/193 |
| 7,376,358 B2 * | 5/2008 | Roberts et al. | ................ | 398/193 |
| 7,382,985 B2 * | 6/2008 | Roberts et al. | ................ | 398/159 |
| 7,398,023 B2 * | 7/2008 | Mazurczyk et al. | ................ | 398/198 |
| 7,450,288 B2 * | 11/2008 | Kikuchi | ................ | 359/239 |
| 7,509,054 B2 * | 3/2009 | Calabro et al. | ................ | 398/152 |
| 7,660,537 B2 * | 2/2010 | Fishman et al. | ................ | 398/193 |
| 7,720,392 B2 * | 5/2010 | Nakashima et al. | ................ | 398/198 |
| 7,844,186 B2 * | 11/2010 | Dorrer et al. | ................ | 398/184 |

(Continued)

FOREIGN PATENT DOCUMENTS

| | | |
|---|---|---|
| CN | 101154994 A | 4/2008 |
| CN | 101207445 A | 6/2008 |

(Continued)

OTHER PUBLICATIONS

Extended European Search Report dated Mar. 21, 2012 issued in corresponding European Patent Application No. 11192328.0.

(Continued)

*Primary Examiner* — Agustin Bello
(74) *Attorney, Agent, or Firm* — Staas & Halsey LLP

(57) ABSTRACT

An optical transmitter includes: a digital signal processor to generate a drive signal from input data; a controller to control an amplitude or power of the drive signal according to information relating to the digital signal processing of the digital signal processor; and an optical modulator to modulate input light with the drive signal controlled by the controller to generate an optical signal.

9 Claims, 14 Drawing Sheets

(56) References Cited

U.S. PATENT DOCUMENTS

| | | | |
|---|---|---|---|
| 7,991,299 B2* | 8/2011 | Ota et al. | 398/198 |
| 8,041,228 B2* | 10/2011 | Charlet et al. | 398/158 |
| 8,068,742 B2* | 11/2011 | Cole et al. | 398/152 |
| 8,073,338 B2* | 12/2011 | Buelow | 398/184 |
| 8,086,109 B2* | 12/2011 | Yuki et al. | 398/152 |
| 8,116,635 B2* | 2/2012 | Tanimura et al. | 398/184 |
| 8,155,488 B2* | 4/2012 | Nilsson et al. | 385/14 |
| 8,184,929 B2* | 5/2012 | Kish et al. | 385/1 |
| 8,195,052 B2* | 6/2012 | Ohtou et al. | 398/158 |
| 8,244,138 B2* | 8/2012 | Hoshida et al. | 398/152 |
| 8,265,489 B2* | 9/2012 | Kikuchi | 398/189 |
| 8,270,843 B2* | 9/2012 | Nakamoto | 398/159 |
| 8,369,712 B2* | 2/2013 | Huang et al. | 398/193 |
| 8,417,126 B2* | 4/2013 | Mandai et al. | 398/184 |
| 8,463,138 B2* | 6/2013 | Sugihara et al. | 398/197 |
| 2003/0011847 A1 | 1/2003 | Dai et al. | 359/161 |
| 2004/0161249 A1* | 8/2004 | Suda et al. | 398/198 |
| 2004/0197103 A1* | 10/2004 | Roberts et al. | 398/159 |
| 2006/0127104 A1 | 6/2006 | Harley et al. | 398/198 |
| 2007/0122161 A1* | 5/2007 | Charlet et al. | 398/188 |
| 2008/0080872 A1 | 4/2008 | Tanaka et al. | |
| 2008/0212979 A1* | 9/2008 | Ota et al. | 398/183 |
| 2008/0239448 A1 | 10/2008 | Tanaka et al. | |
| 2008/0292321 A1 | 11/2008 | Ciaramella et al. | |
| 2009/0175629 A1 | 7/2009 | Liu et al. | |
| 2009/0257755 A1* | 10/2009 | Buelow | 398/184 |
| 2010/0111531 A1* | 5/2010 | Tanimura et al. | 398/65 |
| 2010/0272446 A1* | 10/2010 | Harley et al. | 398/184 |
| 2011/0044702 A1* | 2/2011 | Mizuguchi et al. | 398/184 |
| 2011/0305457 A1 | 12/2011 | Kikuchi | |
| 2012/0148255 A1* | 6/2012 | Liu et al. | 398/136 |
| 2012/0148260 A1* | 6/2012 | Akiyama et al. | 398/184 |

FOREIGN PATENT DOCUMENTS

| | | |
|---|---|---|
| CN | 101630975 A | 1/2010 |
| CN | 101689937 A | 3/2010 |
| EP | 1975693 A1 | 10/2008 |
| EP | 2182657 A1 | 5/2010 |
| JP | 2004-247968 | 9/2004 |
| JP | 2008-236512 | 10/2008 |
| JP | 2008-249848 | 10/2008 |
| JP | 2010-109705 | 5/2010 |
| WO | 2010/100763 A1 | 9/2010 |

OTHER PUBLICATIONS

Hyunwoo Yoo et al., "Improved dispersion tolerance of a Mach-Zehnder modulator by optimizing the modulator voltage and time delay", Optics Communications, vol. 283, No. 7, 2010, pp. 1316-1319.

Hyunwoo Yoo et al., "Improved Dispersion Tolerance of a Mach-Zehnder Modulator by Optimizing the Modulator Voltage and Time Delay", Optics Communications, vol. 283, No. 7, Apr. 2010, pp. 1316-1319.

Office Action mailed Jan. 2, 2014 in corresponding Chinese Application No. 201110411420.5.

Office Action mailed Jul. 8, 2014 in corresponding Japanese Patent Application No. 2010-276938.

* cited by examiner

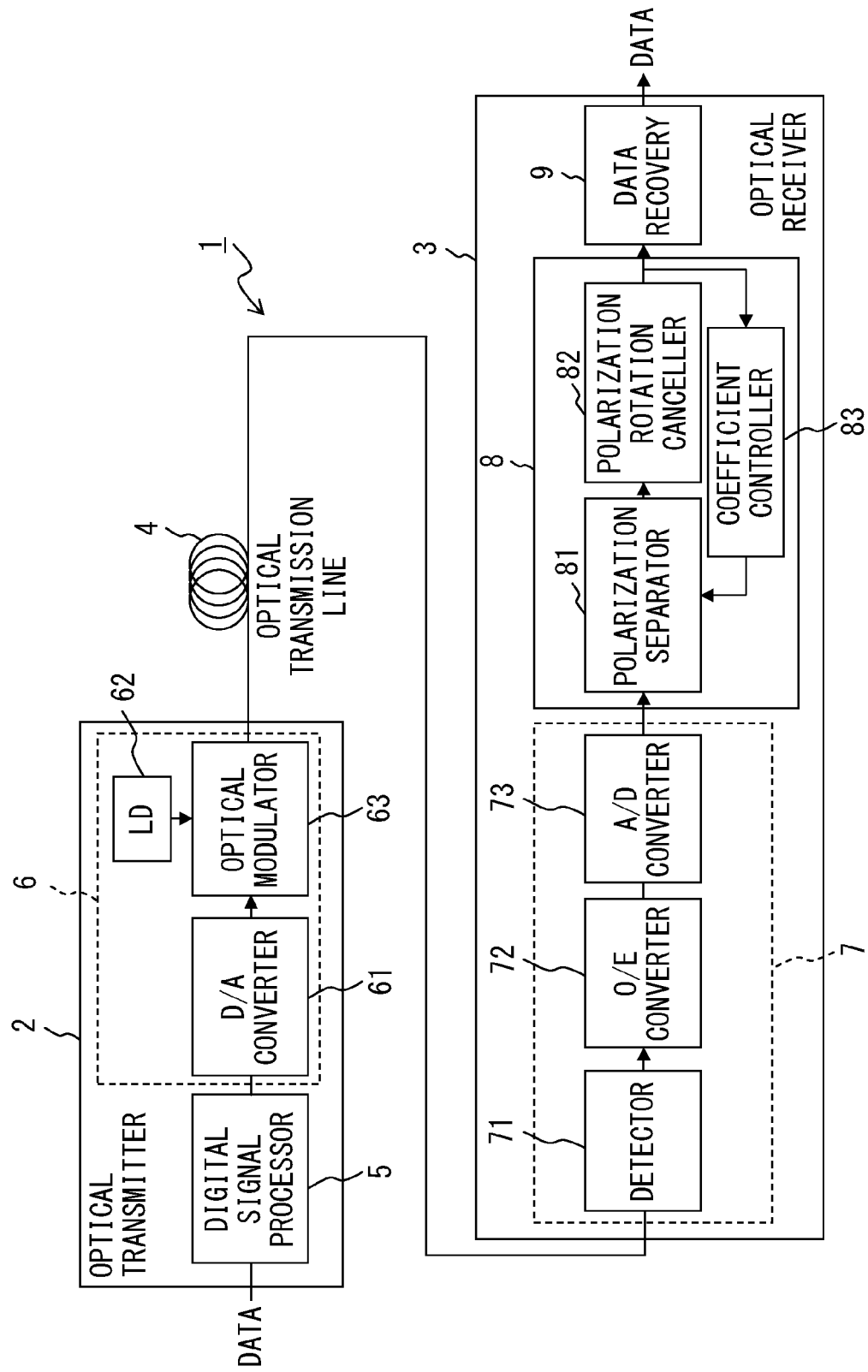
F I G. 1

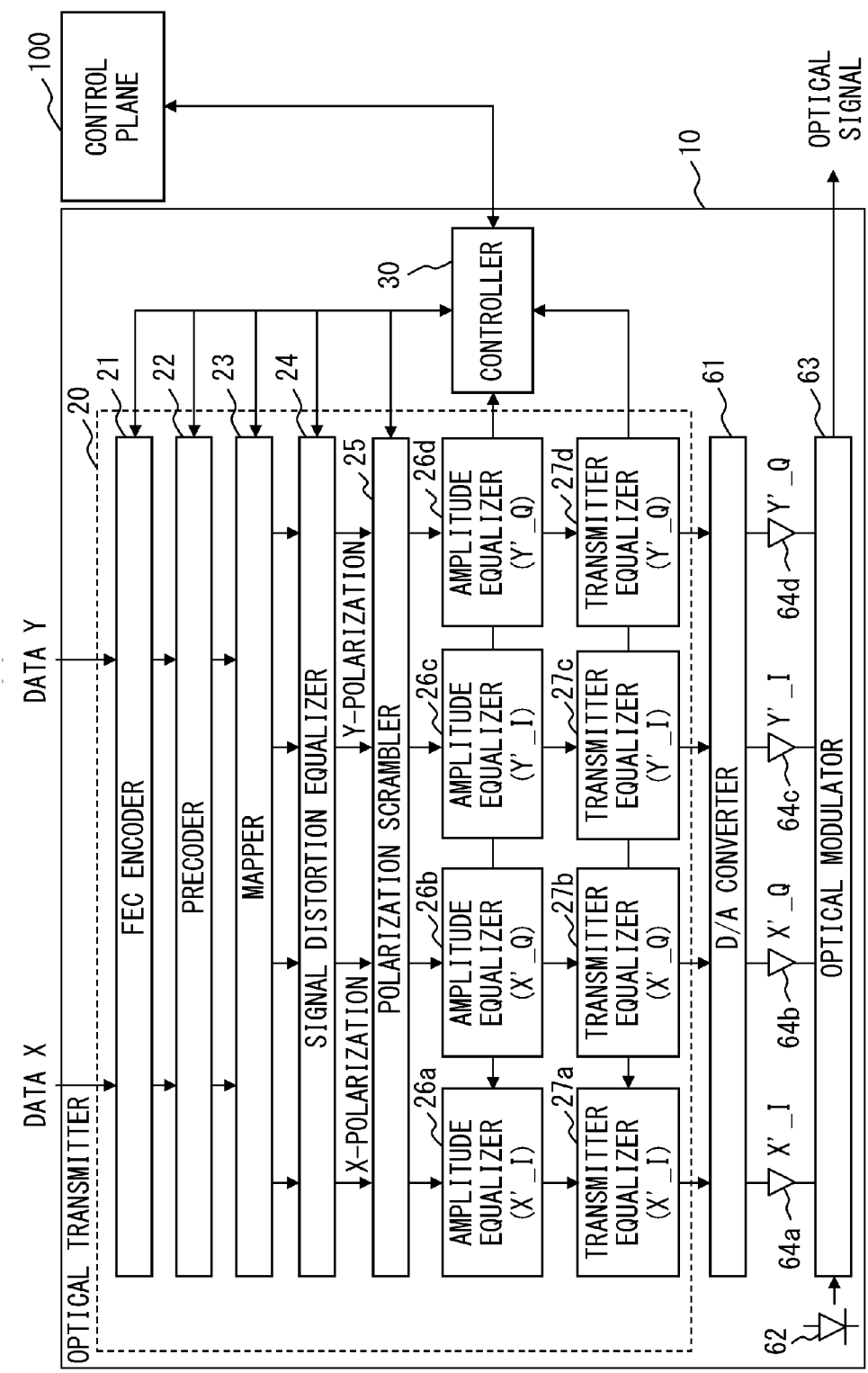
F I G. 4

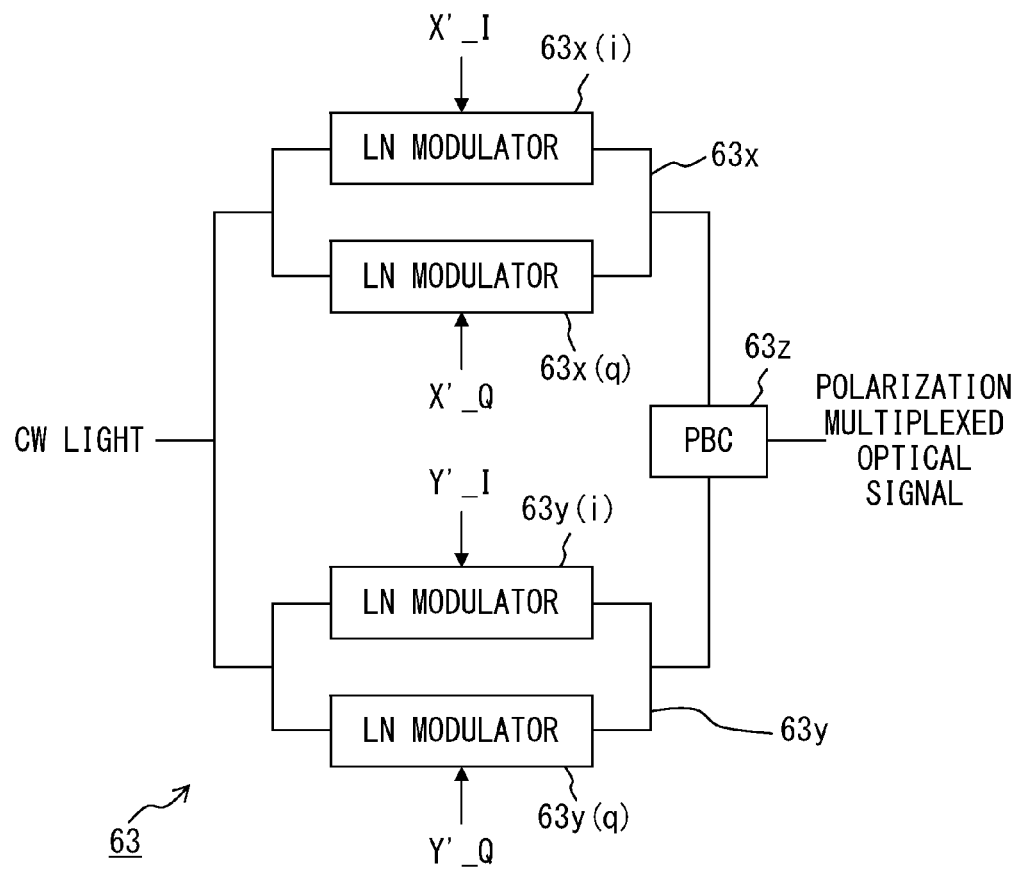
F I G. 5

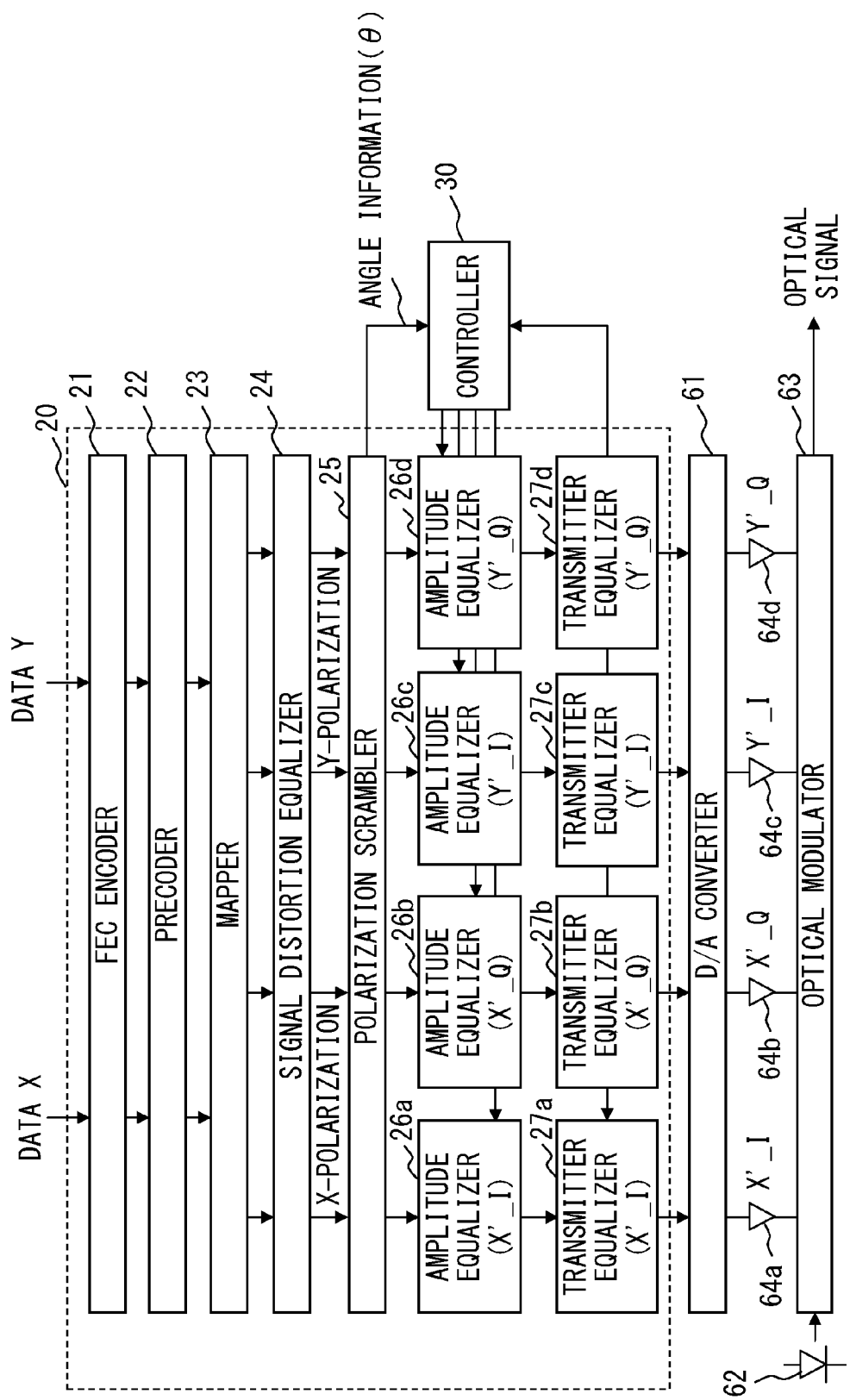
F I G. 6

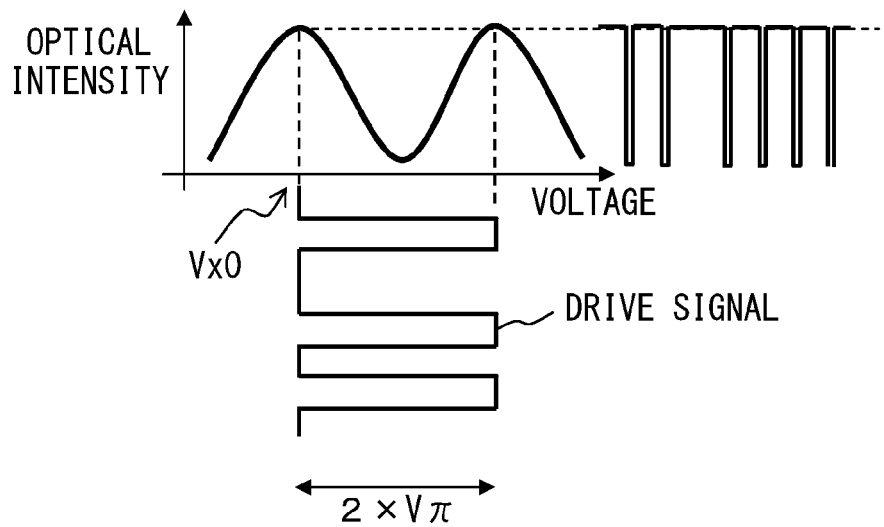
F I G. 7A
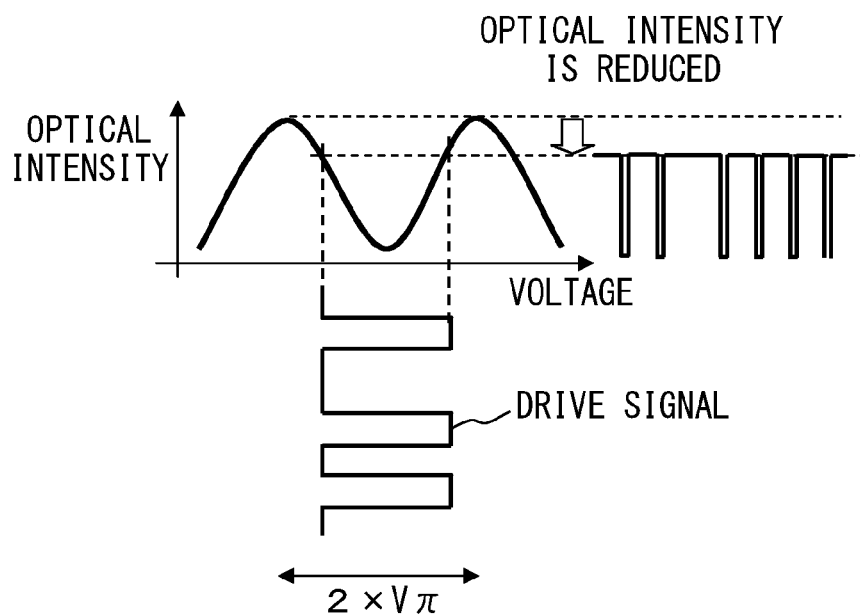
F I G. 7B

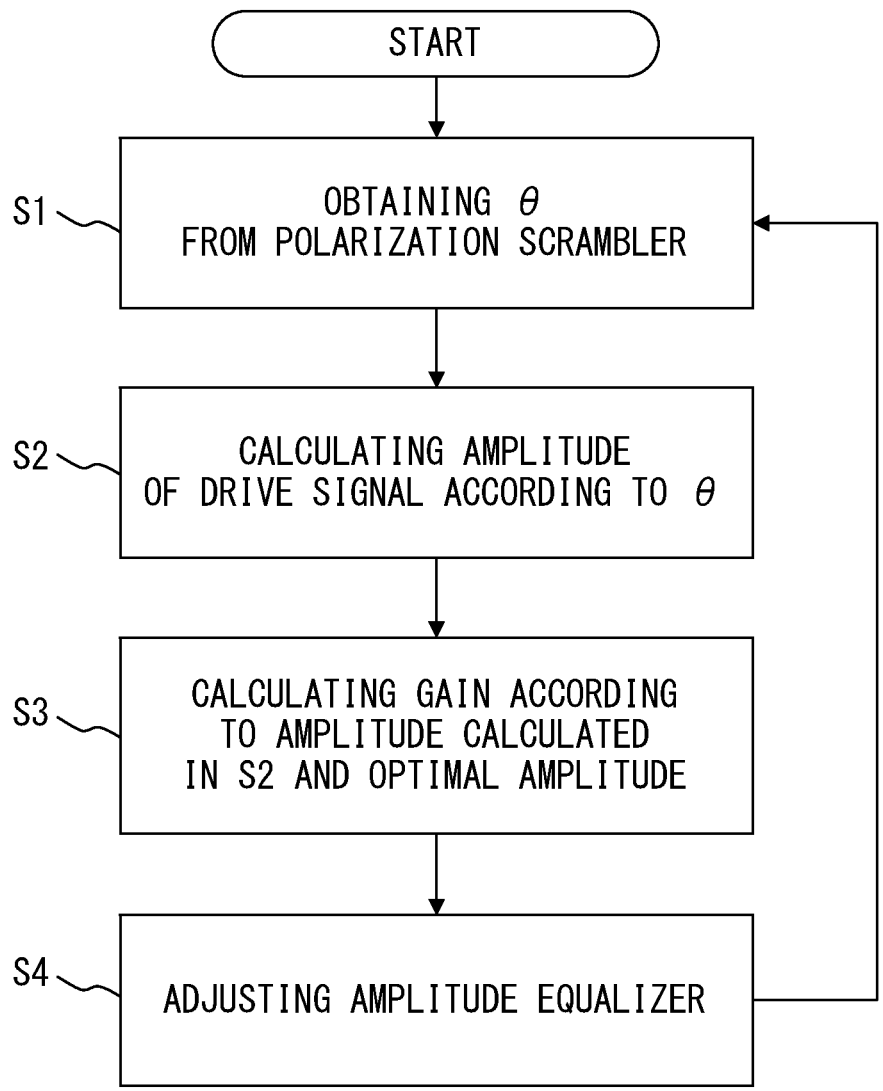
F I G. 8

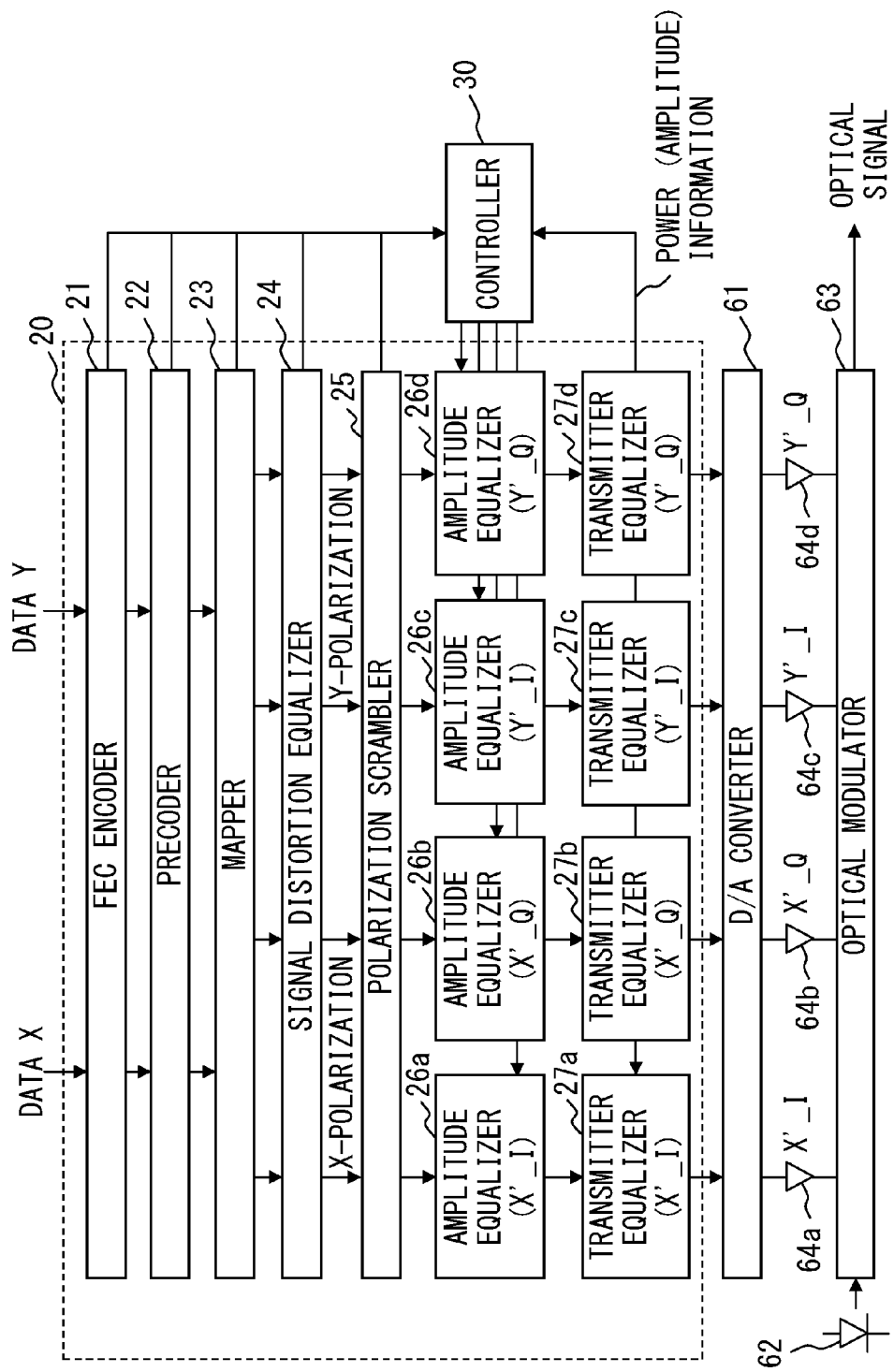
F I G. 1 0

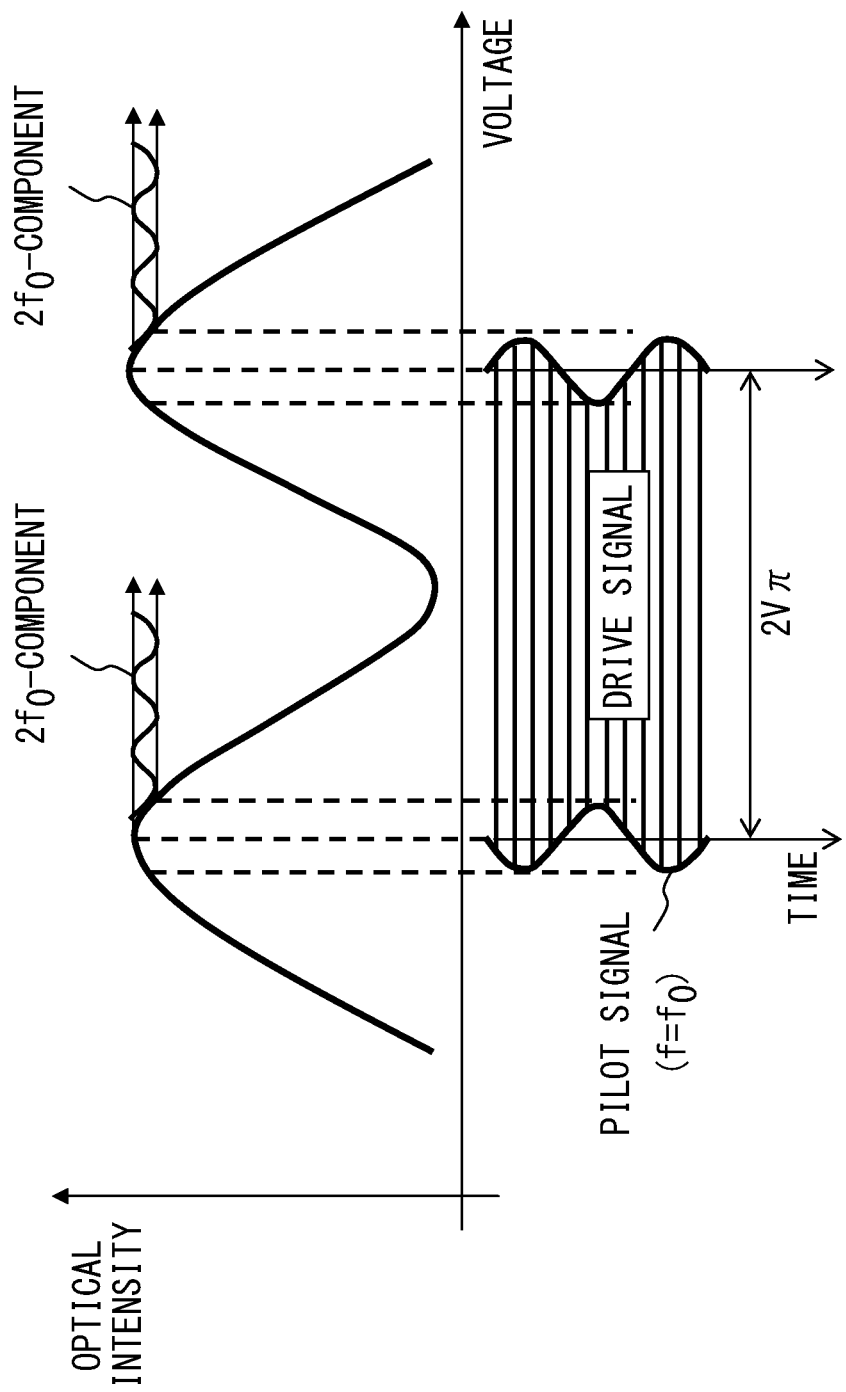
F I G. 1 3

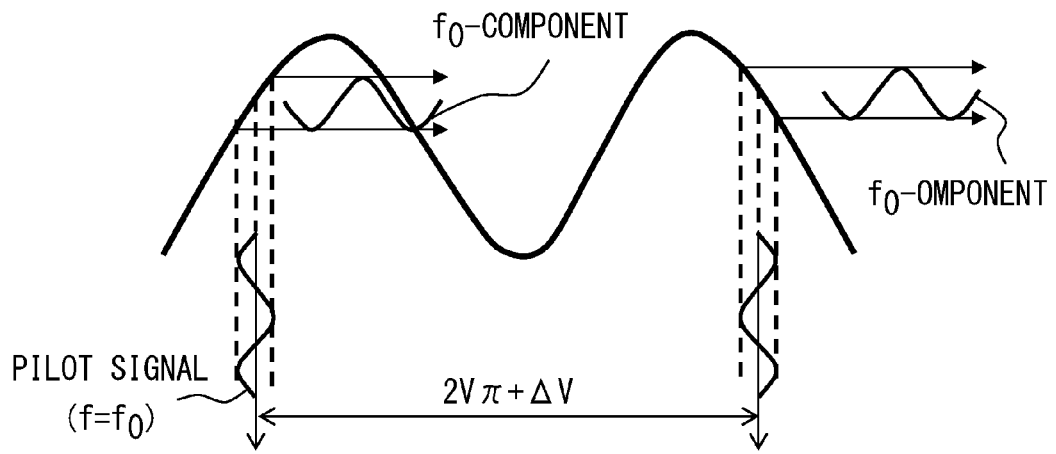
F I G. 1 4 A
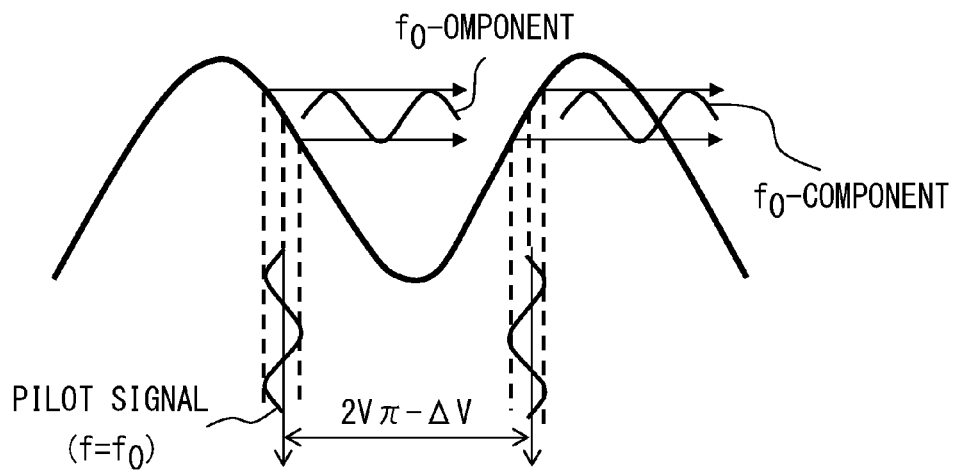
F I G. 1 4 B

OPTICAL TRANSMITTER AND OPTICAL TRANSMISSION METHOD

CROSS-REFERENCE TO RELATED APPLICATION

This application is based upon and claims the benefit of priority of the prior Japanese Patent Application No. 2010-276938, filed on Dec. 13, 2010, the entire contents of which are incorporated herein by reference.

FIELD

The embodiments described in this application are related to an optical transmitter which transmits an optical signal, and to an optical transmission method.

BACKGROUND

In long distance and large capacity optical communication systems, there has been a problem with the waveform distortion of optical signals due to the chromatic dispersion of an optical transmission line and so on. In order to deal with this problem, pre-equalization at the transmitting end of an optical communication system has been proposed for preliminarily forming the waveform of signals so as to compensate for the characteristics of the optical transmission line.

Moreover, polarization multiplex communication in order to achieve high-speed optical communication systems has received attention. The polarization multiplex communication is capable of transmitting two optical signals by using a pair of mutually orthogonal polarization, and thus it is possible to double the transmission capacity.

The polarization characteristics of an optical transmission line are not constant in optical communication systems, and the fluctuation in the polarization characteristics causes a degradation in communication quality. For example, polarization mode dispersion (PMD), polarization dependent loss (PDL), and polarization dependent gain (PDG) may vary with respect to time. For this problem, methods for reducing the polarization-dependent degradation such as PMD/PDL/PDG, which scramble the polarization for transmitting signals, have been proposed.

The above-mentioned pre-equalization methods and polarization scrambling methods are realized by using digital signal processing. In such cases, an optical transmitter includes a digital signal processor and an optical modulator. The digital signal processor generates a drive signal from input data via the signal processing including pre-equalization and/or polarization scrambling. Then, the optical modulator uses the generated drive signal to generate an optical signal which transmits data.

As a related art, optical transmission systems for improving the quality of a transmission signal by using the digital signal processing have been proposed. An optical transmitter of such optical transmission systems includes an optical modulator to output a modulated optical signal, and a signal processor at the transmitting end to perform digital signal processing at the transmitting end on an input signal so as to apply polarization change to the modulated optical signal. The optical modulator performs the optical modulation according to the input signal on which the digital signal processing at the transmitting end is performed by the signal processor at the transmitting end. The optical receiver includes a converter to convert the optical signal from the optical transmitter via a transmission line into a digital electric signal for each polarization component, and a polarization signal processor at the receiving end to perform the digital signal processing at the receiving end on the digital electric signal from the converter, where the polarization change of substantially inverse characteristics with respect to the polarization change at the signal processor at the transmitting end is applied to the received signal. (For example, see Japanese Laid-open Patent Publication No. 2010-109705.)

As described above, the digital signal processing is capable of applying a desired state or desired characteristics to drive signals of the optical modulator, and thereby it is possible to generate an optical signal having a desired state or desired characteristics. However, when several states or characteristics are applied to drive signals by using the digital signal processing, the amplitude of the drive signals may deviate from the drive amplitude with which the optical modulator operates in an optimal state. When the optical modulator operates with drive signals of an inappropriate amplitude, the quality of a transmission signal deteriorates.

SUMMARY

According to an aspect of the invention, an optical transmitter includes: a digital signal processor to generate a drive signal from input data; a controller to control an amplitude or power of the drive signal according to information relating to the digital signal processing of the digital signal processor; and an optical modulator to modulate input light with the drive signal controlled by the controller to generate an optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of an optical communication system of an embodiment.

FIG. 4 is a diagram illustrating the configuration of an optical transmitter according to an embodiment.

FIG. 5 is a diagram illustrating the configuration of an optical modulator.

FIG. 6 is a diagram illustrating the operation of an optical transmitter according to the first embodiment.

FIGS. 7A and 7B are diagrams illustrating optical output with respect to the amplitude of a drive signal.

FIG. 8 is a flowchart illustrating the processes of controlling the amplitude of a drive signal according to the first embodiment.

FIG. 10 is a diagram illustrating the operation of an optical transmitter according to the second embodiment.

FIG. 13 is a diagram illustrating the operation of an LN modulator where an optical signal is generated by a drive signal on which a pilot signal is superimposed.

FIGS. 14A and 14B are diagrams illustrating the operation of an LN modulator when the amplitude of a drive signal deviates from an optimal value.

DESCRIPTION OF EMBODIMENTS

Figure 2:
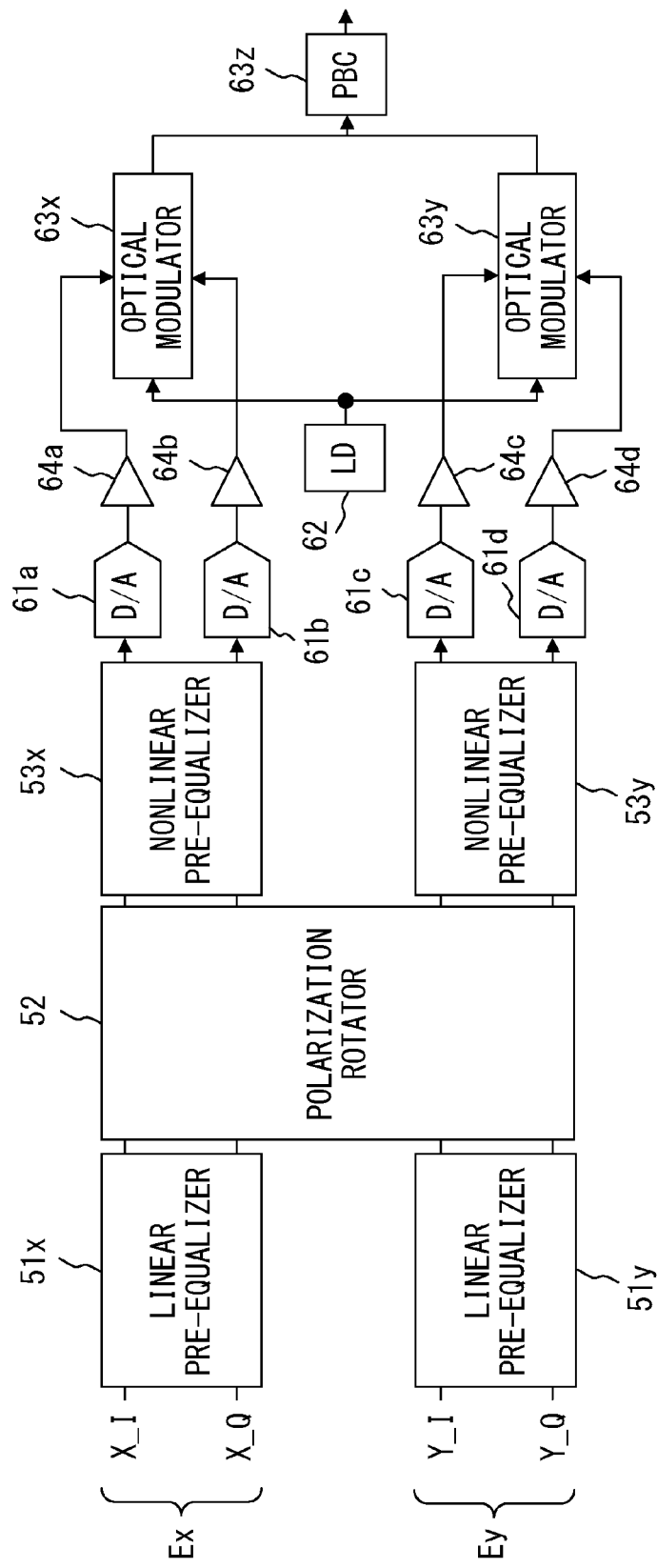
FIG. 2 is a diagram illustrating an example of a digital signal processor and a modulator in an optical transmitter.

FIG. 1 illustrates an example of an optical communication system of an embodiment. An optical communication system 1 of FIG. 1 includes an optical transmitter 2 and an optical receiver 3. An optical transmission line 4 is provided between the optical transmitter 2 and the optical receiver 3. One or more relay node or optical amplifier may be provided in the optical transmission line 4. In the present embodiment, the optical communication system 1 transmits a polarization multiplexed optical signal.

The optical transmitter 2 includes a digital signal processor 5 and a modulator 6. The digital signal processor 5 is an example of a drive signal generator which generates a drive signal, and the digital signal processor 5 generates a drive signal from input data by using the digital signal processing. Here, the digital signal processor 5 is an example of a processor to generate a drive signal or a controlled drive signal. The digital signal processor 5 may be realized in some manners. For example, the digital signal processor 5 may be realized by using an FPGA (Field Programmable Gate Array) or a dedicated LSI. That is to say, the digital signal processor 5 may be realized by a hardware circuit, and the digital signal processor 5 may include a hardware circuit.

The modulator 6 includes a D/A (digital-to-analog) converter 61, a light source 62, and an optical modulator 63. The D/A converter 61 converts the drive signal generated by the digital signal processor 5 into an analog drive signal. The light source 62 is, for example, a laser light source including a laser diode, and generates CW (continuous wave) light. The optical modulator 63 modulates the CW light output from the light source 62 with the analog drive signal obtained by the D/A converter 61 to generate an optical signal. The optical transmitter 2 outputs the optical signal to the optical transmission line 4.

FIG. 2 illustrates an example of the digital signal processor 5 and the modulator 6 in the optical transmitter 2. The digital signal processor 5 includes linear pre-equalizers 51x and 51y, a polarization rotator 52, and nonlinear pre-equalizers 53x and 53y. Note that FIG. 2 illustrates a portion of the functions that the digital signal processor 5 might have. In other words, the digital signal processor 5 may provide other functions.

Transmission data X and transmission data Y are input to the digital signal processor 5. The transmission data X and Y are respectively converted into an I-component signal and a Q-component signal by a symbol mapper (not illustrated) provided in the digital signal processor 5, and are input to the linear pre-equalizers 51x and 51y. The transmission data X is represented as "signal Ex=X_I+jX_Q". The transmission data Y is represented as "signal Ey=Y_I+jY_Q". Note that "j" represents a complex number.

The linear pre-equalizer 51x pre-equalizes the signal Ex according to the linear characteristics of the optical transmission line 4. In a similar manner, the linear pre-equalizer 51y pre-equalizes the signal Ey according to the linear characteristics of the optical transmission line 4. In the present embodiment, it is assumed that, as one of the linear characteristics of the optical transmission line 4, for example, the chromatic dispersion is measured in advance. The measured value of the chromatic dispersion of the optical transmission line 4 (or the control data corresponding to the measured value of the chromatic dispersion) is set to the linear pre-equalizers 51x and 51y. The linear characteristics of the optical transmission line 4 may be calculated by performing a simulation or the like.

The polarization rotator 52 performs a rotational transform on the signals output from the linear pre-equalizers 51x and 51y. Here, signals Ex0 and Ey0 are output from the linear pre-equalizers 51x and 51y, respectively. In this case, the polarization rotator 52 performs rotational transform R as indicated in Equations (1) and (2) to output signals Ex1 and Ey1.

$$\begin{pmatrix} Ex1 \\ Ey1 \end{pmatrix} = R \begin{pmatrix} Ex0 \\ Ey0 \end{pmatrix} \quad (1)$$

$$R = \begin{pmatrix} \cos\theta & -\sin\theta \\ \sin\theta & \cos\theta \end{pmatrix} \quad (2)$$

Note that "θ" changes with respect to time. In one example, the angle of polarization rotation θ periodically changes. For example, "θ=0" in time T0 through T1, "θ=π/4" in time T1 through T2, "θ=π/2" in time T2 through T3, and "θ=3π/4" in time T3 through T4. However, it is not necessary for the angle of polarization rotation θ to change periodically. It is also not necessary for the angle of polarization rotation θ to change for a certain angle step. However, it is preferable for the angle of polarization rotation θ to become zero periodically.

Figure 3:
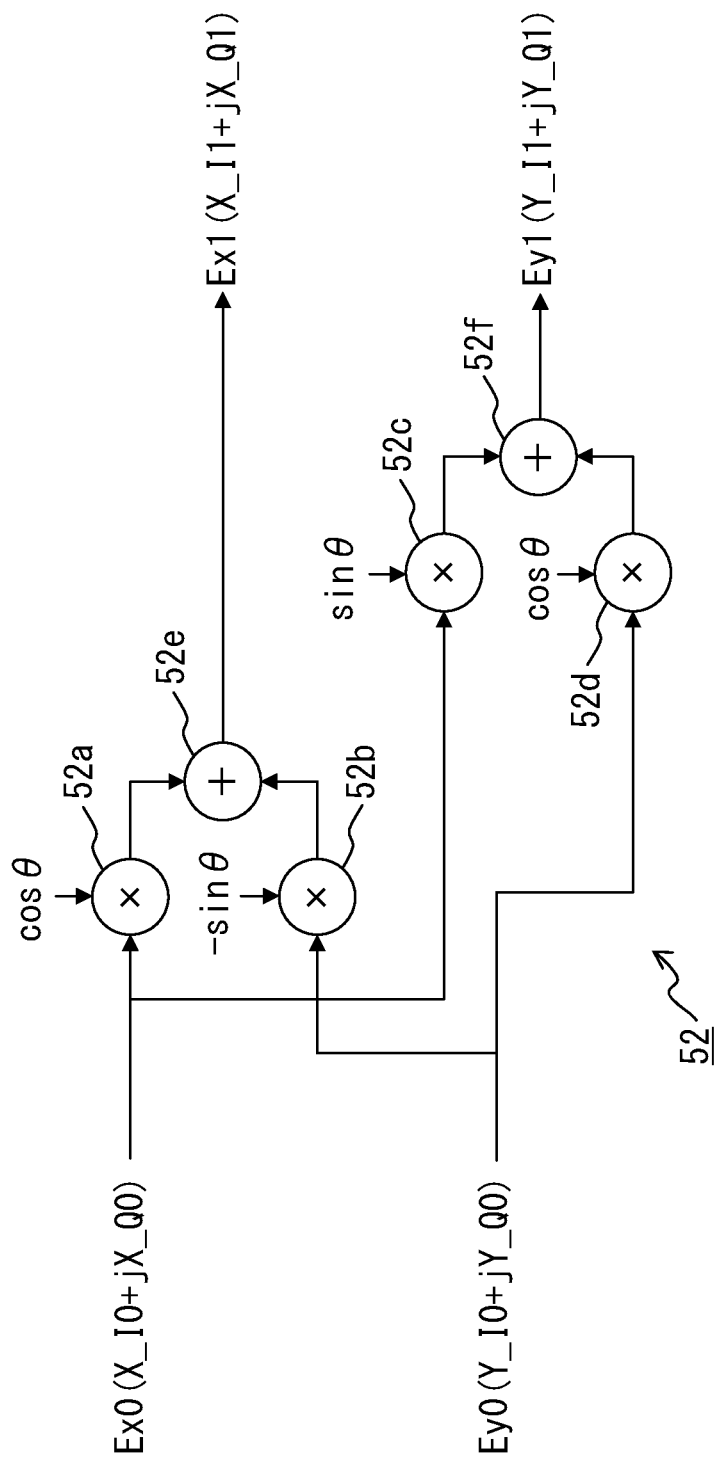
FIG. 3 is a diagram illustrating an example of a polarization rotator.

The polarization rotator 52 is realized, for example, by complex multipliers 52a-52d and complex adders 52e-52f, as illustrated in FIG. 3. In FIG. 3, the input signals Ex0 and Ey0 are expressed by the following equations.

$Ex0=X\_I0+jX\_Q0$ $Ey0=Y\_I0+jY\_Q0$

The signal Ex0 is input to the complex multipliers 52a and 52c. Here, cos θ is given to the complex multiplier 52a, and sin θ is given to the complex multiplier 52c. Accordingly, the complex multiplier 52a performs the complex multiplication of Ex0 and cos θ, and the complex multiplier 52c performs the complex multiplication of Ex0 and sin θ. The complex adder 52e obtains a signal Ex1 by calculating the sum of the signals output from the complex multipliers 52a and 52c as follows.

$Ex1=X\_I1+jX\_Q1$

The signal Ey0 is input to the complex multipliers 52b and 52d. Here, −sin θ is given to the complex multiplier 52b, and cos θ is given to the complex multiplier 52d. Accordingly, the complex multiplier 52b performs the complex multiplication of Ey0 and −sin θ, and the complex multiplier 52d performs the complex multiplication of Ey0 and cos θ. The complex adder 52f obtains a signal Ey1 by calculating the sum of the signals output from the complex multipliers 52b and 52d as follows.

$Ey1=Y\_I1+jY\_Q1$

The nonlinear pre-equalizer 53x pre-equalizes the signal Ex1 output from the polarization rotator 52 according to the nonlinear characteristics of the optical transmission line 4. In a similar manner, the nonlinear pre-equalizer 53y pre-equalizes the signal Ey1 output from the polarization rotator 52 according to the nonlinear characteristics of the optical transmission line 4. In the present embodiment, it is assumed that the nonlinear characteristics of the optical transmission line 4 are measured in advance. The nonlinear characteristics of the optical transmission line 4 (or the control data corresponding to the nonlinear characteristic) are set to the nonlinear pre-equalizers 53x and 53y. The nonlinear characteristics of the optical transmission line 4 may be calculated by performing simulation or the like.

The modulator 6 includes, as described above, the D/A converter 61, the light source 62, and the optical modulator 63. The D/A converter 61 includes D/A converters 61a-61d. The optical modulator 63 includes optical modulators 63x and 63y, and a polarization beam combiner (PBC) 63z. In addition, the modulator 6 further includes amplifiers 64a-64d.

The D/A converter 61a converts the I-component of the signal Ex1 output from the nonlinear pre-equalizer 53x into an analog signal. The D/A converter 61b converts the Q-component of the signal Ex1 output from the nonlinear pre-equalizer 53x into an analog signal. In a similar manner, the D/A converters 61c and 61d respectively convert the I-component and Q-component of the signal Ey output from the nonlinear pre-equalizer 53y into an analog signal. The amplifiers 64a-64d amplify the analog signals output from the D/A converters 61a-61d, respectively.

The optical modulator 63x includes, for example, a pair of LN modulators optically coupled in parallel. Each LN modulator is realized, for example, by utilizing a Mach-Zehnder interferometer. The CW light generated by the light source 62 is input to the pair of LN modulators of the optical modulator 63x. Further, the signals amplified by the amplifiers 64a and 64b are applied to the pair of LN modulators of the optical modulator 63x as drive signals, respectively. In other words, the optical modulator 63x modulates the input CW light with the signal Ex1 output from the nonlinear pre-equalizer 53x to generate an optical signal.

The configuration and operation of the optical modulator 63y are substantially the same as those of the optical modulator 63x. However, the signals amplified by the amplifiers 64c and 64d are applied to the optical modulator 63y as drive signals. Further, the polarization beam combiner 63z combines the optical signals generated by the optical modulators 63x and 63y to output a polarization multiplexed optical signal.

The polarization multiplexed optical signal output from the optical transmitter 2 is transmitted via the optical transmission line 4, and is received by the optical receiver 3. The optical receiver 3 demodulates the received polarization multiplexed optical signal to recover the transmission data.

The optical receiver 3 includes a converter 7, a digital signal processor 8, and a data recovery 9, as illustrated in FIG. 1. The converter 7 includes a detector 71, an O/E (optical/electrical) converter 72, and an A/D (analog-to-digital) converter 73. The detector 71 detects an optical signal for each polarization component. Thus, the detector 71 may include polarization demultiplexer. The O/E converter 72 includes a photodetector such as a photodiode, and converts the optical signals output from the detector 71 for each polarization component into respective electric signals. The A/D converter 73 converts the electric signals output from the O/E converter 72 into respective digital signals.

The digital signal processor 8 includes a polarization separator 81, a polarization rotation canceller 82, and a coefficient controller 83. The polarization separator 81 estimates a transmission signal sequence from the digital signals obtained from the converter 7 by utilizing a coefficient given from the coefficient controller 83. The polarization rotation canceller 82 performs inverse conversion, which cancels the polarization rotation given in the optical transmitter 2, on the transmission signal sequence obtained by the polarization separator 81. The coefficient controller 83 generates a coefficient for compensating for the transmission characteristics of the optical transmission line 4 according to the signal sequence obtained by the polarization rotation canceller 82, and provides the generated coefficient to the polarization separator 81. As described above, the digital signal processor 8 estimates the transmission signal sequence while canceling the polarization rotation given in the optical transmitter 2. Then, the data recovery 9 recovers the transmission data from the signal sequence obtained in the digital signal processor 8.

As described above, in the optical communication system 1 according to the present embodiment, the optical transmitter 2 performs pre-equalization to compensate for the characteristics of the optical transmission line 4. Accordingly, the optical receiver 3 receives an optical signal in which the characteristics of the optical transmission line 4 have been compensated for.

Moreover, in the optical communication system 1 according to the present embodiment, the optical transmitter scrambles the polarization state of the polarization multiplexed optical signal. Accordingly, the polarization-dependent degradation caused due to polarization mode dispersion (PMD), polarization dependent loss (PDL), polarization dependent gain (PDG), or the like is suppressed or controlled.

FIG. 4 illustrates the configuration of an optical transmitter according to the embodiment. An optical transmitter 10 according to the present embodiment includes a digital signal processor (DSP) 20, a controller 30, a D/A converter 61, a light source 62, an optical modulator 63, and amplifiers 64a-64d, as illustrated in FIG. 4. The optical transmitter 10 may be used instead of the optical transmitter 2 in the optical communication system 1 of FIG. 1.

In the present embodiment, data X and data Y are input to the optical transmitter 10. The digital signal processor 20 generates a drive signal from the data X and data Y in accordance with the control of the controller 30. The optical modulator 63 generates an optical signal for transmitting the data X and data Y by modulating input light with the drive signal generated by the digital signal processor 20. In the present embodiment, the optical transmitter 10 transmits the data X and data Y by polarization multiplexing scheme.

The digital signal processor 20 includes an FEC encoder 21, a precoder 22, a mapper 23, a signal distortion equalizer 24, a polarization scrambler 25, amplitude equalizers 26a-26d, and transmitter equalizers 27a-27d. The digital signal processor 20 is realized, for example, by utilizing a digital signal processor (DSP). The digital signal processor 20 may be realized by other configurations. In other words, the digital signal processor 20 may be realized, for example, by utilizing an FPGA or a dedicated LSI.

The FEC encoder 21 adds an FEC (Forward Error Correction) code for the error correction to the input data X and data Y, respectively. The type of FEC code is not limited, and may be, for example, a block code or a convolutional code. The FEC encoder 21 adds the FEC code to the data X and data Y in accordance with an instruction from the controller 30.

The data generated by the FEC encoder 21 is input to the precoder 22. The precoder 22 generates transmission data from the input data according to the coding scheme specified by the controller 30. For example, when the optical transmitter 10 transmits the data X and data Y by using DQPSK (Differential Quadrature Phase Shift Keying), the precoder 22 may generate the transmission data by calculating the difference among neighboring symbols of the input data.

A data bit sequence generated by the precoder 22 is input to the mapper 23. The mapper 23 maps the input data bit sequence to a complex symbol sequence according to the modulation scheme specified by the controller 30. For example, when the modulation scheme is QPSK or DQPSK, the mapper 23 maps 2-bit data to one symbol. When the modulation scheme is 16QAM, the mapper 23 maps 4-bit data to one symbol.

The mapper 23 generates signal Ex and signal Ey by performing the mapping as described above. The signal Ex is generated, for example, by mapping the data X which is processed by the FEC encoder 21 and the precoder 22. Similarly, the signal Ey is generated, for example, by mapping the data Y which is processed by the FEC encoder 21 and the precoder 22.

The signal Ex and signal Ey generated by the mapper 23 are input to the signal distortion equalizer 24. The signal distortion equalizer 24 equalizes the signals Ex and Ey so as to compensate for the characteristics of the optical transmission line 4. Here, the signal distortion equalizer 24 equalizes the signals Ex and Ey so as to compensate for the chromatic dispersion of the optical transmission line 4, in a similar manner to, for example, the linear pre-equalizers $51x$ and $51y$ of FIG. 2. Further, the signal distortion equalizer 24 may also compensate for the nonlinear characteristics of the optical transmission line 4, in a similar manner to the nonlinear pre-equalizers $53x$ and $53y$ of FIG. 2. Note that the information of the characteristics (for example, the chromatic dispersion) of the optical transmission line 4 is provided by the controller 30 to the signal distortion equalizer 24.

The polarization scrambler 25 performs a polarization rotational transform on the signals Ex and Ey which are equalized by the signal distortion equalizer 24. Here, the polarization scrambler 25 performs the rotational transform. R indicated by equations (1) and (2), in a similar manner to the polarization rotator 52 of FIG. 2. In other words, the polarization scrambler 25 performs the rotational transform. R on the signals Ex and Ey to generate signals Ex' and Ey'. The signals Ex' and Ey' are expressed by the following equations.

$$Ex'=X'\_I+jX'\_Q$$

$$Ey'=Y'\_I+jY'\_Q$$

The signal Ex' is a drive signal for generating an optical signal which transmits information by using X-polarization (hereinafter, referred to as an X-polarization optical signal). Thus, the signal Ex' may be referred to as an X'-polarization drive signal. In addition, the I-component (X'_I) and Q-component (X'_Q) of the X'-polarization drive signal are drive signals for generating the I-component and Q-component of the X-polarization optical signal, respectively, and may be referred to as a drive signal X'_I and a drive signal X'_Q.

The signal Ey' is a drive signal for generating an optical signal which transmits information by using Y-polarization (hereinafter, referred to as a Y-polarization optical signal). Thus, the signal Ey' may be referred to as a Y'-polarization drive signal. In addition, the I-component (Y'_I) and Q-component (Y'_Q) of the Y'-polarization drive signal are drive signals for generating the I-component and Q-component of the X-polarization optical signal, respectively, and may be referred to as a drive signal Y'_I and drive signal Y'_Q.

The drive signals generated by the polarization scrambler 25 are input to the amplitude equalizers 26a-26d. The amplitude equalizers 26a-26d adjust the amplitude of the drive signals generated by the polarization scrambler 25 according to the control of the controller 30. In this example, the amplitude equalizer 26a adjusts the amplitude of the drive signal X'_I. The amplitude equalizer 26b adjusts the amplitude of the drive signal X'_Q. The amplitude equalizer 26c adjusts the amplitude of the drive signal Y'_I. The amplitude equalizer 26d adjusts the amplitude of the drive signal Y'_Q.

The drive signals adjusted by the amplitude equalizers 26a-26d are input to the transmitter equalizers 27a-27d. The transmitter equalizers 27a-27d compensate for the nonlinear characteristics produced within the optical transmitter 10 and the phase difference among the drive signals. For example, when the lengths of paths from the transmitter equalizers 27a-27d to the optical modulator 63 are not identical each other, a phase difference is caused among the drive signals. In this case, the transmitter equalizers 27a-27d compensate for the drive signals so as to compensate for the phase difference. Note that the transmitter equalizers 27a-27d perform compensation as described above in accordance with the control information provided by the controller 30.

As described above, the digital signal processor 20 generates the drive signals X'_I, X'_Q, Y'_I, and Y'_Q to drive the optical modulator 63 from the input data X and data Y. At this time, the digital signal processor 20 performs pre-equalization in order to compensate for the characteristics of the optical transmission line 4, and performs polarization scramble.

Here, the digital signal processor 20 (excluding the amplitude equalizers 26a-26d) is an example of a drive signal generator which generates a drive signal from input data in the digital signal processing. Moreover, the controller 30 and the amplitude equalizers 26a-26d are an example of a controller which controls the amplitude or power of the drive signal according to information relating to the digital signal processing performed by the above-mentioned drive signal generator. In a different aspect, the digital signal processor 20 may be an example of a digital signal processor which generates a drive signal from input data in the digital signal processing. Moreover, the controller 30 may be an example of a controller which controls the amplitude or power of the drive signal according to information relating to the digital signal processing performed by the digital signal processor.

The D/A converter 61, the light source 62, the optical modulator 63, and the amplifiers 64a-64d have been described above with reference to FIGS. 1 and 2. In other words, the D/A converter 61 converts the drive signals X'_I, X'_Q, Y'_I, and Y'_Q generated by the digital signal processor 20 into respective analog signals. The amplifiers 64a-64d amplify the respective analog drive signals output from the D/A converter 61. The light source 62 generates CW light. The optical modulator 63 modulates the input light with the drive signals X'_I, X'_Q, Y'_I, and Y'_Q to generate an optical signal.

The optical modulator 63 includes an optical modulator $63x$ which generates an X-polarization optical signal, an optical modulator $63y$ which generates a Y-polarization optical signal, and a polarization beam combiner $63z$, as illustrated in FIG. 5. The optical modulator $63x$ includes, for example, a pair of LN modulators $63x(i)$ and $63x(q)$ optically coupled in parallel. In this case, the LN modulator $63x(i)$ generates an optical signal in accordance with the drive signal X'_I, and the LN modulator $63x(q)$ generates an optical signal in accordance with the drive signal X'_Q. In a similar manner, the optical modulator $63y$ includes a pair of LN modulators $63y(i)$ and $63y(q)$ optically coupled in parallel. In this case, the LN modulator $63y(i)$ generates an optical signal in accordance with the drive signal Y'_I, and the LN modulator $63y(q)$ generates an optical signal in accordance with the drive signal Y'_Q.

The polarization beam combiner $63z$ combines (that is, polarization-multiplexes) the X-polarization optical signal generated by the optical modulator $63x$ and the Y-polarization optical signal generated by the optical modulator $63y$ to generate a polarization multiplexed optical signal. Then, the optical transmitter 10 outputs the polarization multiplexed optical signal.

The controller 30 receives control information from the control plane 100, and controls the operation of the optical transmitter 10 in accordance with the received control information. The controller 30 may be realized by a processor (and a memory) to execute a given program. The control plane 100 is a network management device which manages the entire optical communication system, and the control plane 100 transmits control information to the optical transmitters and optical receivers in the optical communication system. The control information which is transmitted from the control plane 100 to the optical transmitters and optical receivers include, for example, the information specifying the modulation scheme, the information indicating the characteristics (for example, the chromatic dispersion) of the optical transmission line, and the information for controlling the polarization. The controller 30 controls the FEC encoder 21, the precoder 22, the mapper 23, the signal distortion equalizer 24, the polarization scrambler 25, the amplitude equalizers 26a-26d, and the transmitter equalizers 27a-27d, in accordance with the control information received from the control plane 100.

For example, upon receiving from the control plane 100 the information which indicates the modulation scheme, the controller 30 determines the mapping pattern of the mapper 23. Moreover, upon receiving from the control plane 100 the information which indicates the amount of dispersion compensation, the controller 30 determines the coefficient of a digital filter provided for the signal distortion equalizer 24. Furthermore, upon receiving from the control plane 100 the information for controlling the polarization, the controller controls the rotational transform of the polarization scrambler 25.

In the example of FIG. 4, the controller 30 receives control information from the control plane 100 which is connected to the network, but the optical transmitter of the present embodiment is not limited to this configuration. For example, the administrator of the optical communication system may input the above-mentioned control information to the controller 30 by using a specified interface without via the network.

<First Embodiment>

FIG. 6 is a diagram illustrating the operation of the optical transmitter 10 according to the first embodiment. In the first embodiment, the change in the amplitude of a drive signal caused due to the polarization rotation by the polarization scrambler 25 is compensated for. Note that, in the first embodiment, the change in the amplitude of a drive signal is compensated for in the feedforward operation performed by the polarization scrambler 25, the controller 30, and the amplitude equalizers 26a-26d.

In the following descriptions, it is assumed that the signals Ex and Ey below are input to the polarization scrambler 25. It is also assumed that the signal processing by the signal distortion equalizer 24 and the transmitter equalizers 27a-27d is ignored.

$$Ex = X\_I + jX\_Q$$

$$Ey = Y\_I + jY\_Q$$

The polarization scrambler 25 performs the rotational transform indicated in Equation (3) on the signals Ex and Ey to output signals Ex' and Ey'.

$$\begin{pmatrix} Ex' \\ Ey' \end{pmatrix} = \begin{pmatrix} \cos\theta & -\sin\theta \\ \sin\theta & \cos\theta \end{pmatrix} \begin{pmatrix} Ex \\ Ey \end{pmatrix} \quad (3)$$

$$Ex' = X'\_I + jX'\_Q$$

$$Ey' = Y'\_I + jY'\_Q$$

Note that "θ" represents the angle of polarization rotation, and changes with respect to time. For example, the polarization scrambler 25 changes the angle of polarization rotation θ in a specified cycle. In this case, the polarization scrambler 25 periodically performs, for example, "θ=θ+Δθ". However, it is not always necessary for the angle of polarization rotation θ to change periodically. It is also not necessary for the angle step Δθ to be constant. However, it is preferable for the angle of polarization rotation θ to become zero periodically.

When equation (3) is expanded, the signals Ex' and Ey' are expressed as follows, respectively.

$$Ex' = (X\_I + jX\_Q)\cos\theta - (Y\_I + jY\_Q)\sin\theta$$
$$= (X\_I\cos\theta - Y\_I\sin\theta) + j(X\_Q\cos\theta - Y\_Q\sin\theta)$$

$$Ey' = (X\_I + jX\_Q)\sin\theta + (Y\_I + jY\_Q)\cos\theta$$
$$= (X\_I\sin\theta + Y\_I\cos\theta) + j(X\_Q\sin\theta + Y\_Q\cos\theta)$$

Here, the real number component and imaginary number component of the signal Ex' are used as drive signals for driving the I-arm and Q-arm of the optical modulator 63x, respectively. In a similar manner, the real number component and imaginary number component of the signal Ey' are used as drive signals for driving the I-arm and Q-arm of the optical modulator 63y, respectively. Accordingly, the drive signals X'\_I, X'\_Q, Y'\_I, and Y'\_Q of the optical modulator 63 are expressed as follows.

X'\_I: X\_I cos θ−Y\_I sin θ

X'\_Q: X\_Q cos θ−Y\_Q sin θ

Y'\_I: X\_I sin θ+Y\_I cos θ

Y'\_Q: X\_Q sin θ+Y\_Q cos θ

As described above, when the polarization scrambler 25 performs polarization rotation, the drive signals applied to the optical modulator 63 are dependent on the angle of polarization rotation θ. As a result, the amplitude of the drive signals applied to the optical modulator 63 is also dependent on the angle of polarization rotation θ.

FIGS. 7A and 7B are diagrams illustrating optical output with respect to the amplitude of a drive signal. In FIGS. 7A and 7B, the optical modulator is an LN modulator. In addition, it is assumed that an LN modulator generates an optical signal with a 2Vπ drive. Note that Vπ represents the voltage for changing the optical power of an LN modulator from a minimum value to a maximum value.

In this case, when driven with a drive signal whose amplitude is adjusted to 2Vπ as illustrated in FIG. 7A, the LN modulator generates an optical signal with optimal efficiency. On the other hand, when the amplitude of a drive signal deviates from 2Vπ as illustrated in FIG. 7B, the intensity of the optical signal output from the LN modulator is reduced.

When the intensity of an optical signal is reduced, the optical S/N ratio deteriorates. Accordingly, it is preferable that the amplitude of the drive signals X'_I, X'_Q, Y'_I, and Y'_Q generated in the digital signal processor 20 are adjusted to $2V\pi$.

An example will be given. In the following description, it is assumed that the modulation scheme of an X-polarization optical signal and a Y-polarization optical signal are both QPSK. Moreover, it is assumed that "0" or "1" is assigned, according to the input data, to the signal components X_I, X_Q, Y_I, and Y_Q of the signals Ex and Ey which are output from the mapper 23. Further, it is assumed that when X_I is "0" and "1", the D/A converter 61 and the amplifiers 64a-64d are designed such that the voltage of a drive signal generated by the LN modulator will be, for example, "$V_x 0$" and "$V_x 0+2V\pi$", respectively, in FIG. 7A. It is also assumed that the D/A converter 61 and the amplifiers 64a-64d are designed for the signal components X_Q, Y_I, and Y_Q in a similar manner to the case of X_I.

In the above-described configuration, the drive signal X'_I is for example expressed as in the following equation.

$$X'\_I: X\_I \cos\theta - Y\_I \sin\theta$$

Accordingly, when the angle of polarization rotation $\theta$ is zero, "X'_I=X_I" is obtained. In other words, when the angle of polarization rotation $\theta$ is zero, the voltage of the drive signal X'_I is "$V_x 0$" or "$V_x 0+2V\pi$", and the amplitude of the drive signal X'_I becomes $2V\pi$. In this case, the LN modulator generates an optical signal with optimal efficiency according to the drive signal X'_I.

However, the optical transmitter 10 includes the polarization scrambler 25, and the angle of polarization rotation $\theta$ changes with respect to time. For this reason, when the angle of polarization rotation $\theta$ is not zero, the amplitude of the drive signal X'_I may change to a value different from $2V\pi$, as illustrated in FIG. 7B. In other words, when the angle of polarization rotation $\theta$ is not zero, the intensity of the optical signal output from the LN modulator is reduced, and the optical S/N ratio may deteriorate. Note that this problem arises with the other drive signals X'_Q, Y'_I, and Y'_Q in a similar manner.

Accordingly, the optical transmitter 10 of the first embodiment controls the amplitude of drive signals according to the angle of polarization rotation $\theta$ given from the polarization scrambler 25. In other words, the controller 30 controls the gain of the amplitude equalizers 26a-26d according to the angle of polarization rotation $\theta$, and thereby optimizes the amplitude of the drive signals X'_I, X'_Q, Y'_I, and Y'_Q (i.e., $2V\pi$ of the LN modulator).

FIG. 8 is a flowchart illustrating the processes of controlling the amplitude of the drive signal according to the first embodiment. The processes of this flowchart are performed by the controller 30, for example, periodically. The controller 30 performs the processes of the flowchart of FIG. 8, for example, at time intervals shorter than the cycle in which the polarization scrambler 25 changes the angle of polarization rotation $\theta$. Alternatively, the controller 30 may perform the processes of the flowchart of FIG. 8 in synchronization with the timing at which the polarization scrambler 25 changes the angle of polarization rotation $\theta$.

In S1, the controller 30 obtains from polarization scrambler 25 the angle information which indicates the angle of polarization rotation $\theta$. The polarization scrambler 25 includes, for example, a clock or a counter, and calculates the angle of polarization rotation $\theta$ according to the elapsed time from a reference time, and provides the polarization rotation to the signals Ex and Ey.

However, it is not always necessary for the controller 30 to obtain the angle information from the polarization scrambler 25. For example, if the controller 30 calculates the angle of polarization rotation $\theta$ and notifies the polarization scrambler 25 of the calculated angle, it will not be necessary for the controller 30 to obtain the angle information from the polarization scrambler 25. In this case, the controller 30 calculates the angle of polarization rotation $\theta$ in S1 in place of obtaining the angle information.

In S2, the controller 30 calculates the amplitude of the drive signals X'_I, X'_Q, Y'_I, and Y'_Q according to the obtained or calculated angle of polarization rotation $\theta$. As an example, the case of drive signal X'_I will be described. In the following descriptions, it is assumed that according to the input data, "0" or "1" is assigned to the respective signal components X_I, X_Q, Y_I, and Y_Q of the signals Ex and Ey which are output from the mapper 23. Note that the controller 30 recognizes the modulation scheme of the optical transmitter 10, and thus recognizes a possible value which the signal component of the signals Ex and Ey might take.

In this case, the controller 30 calculates the drive signal X'_I for (X_I, Y_I)=(1,1)(1,0)(0,1)(0,0), respectively. In other words, X'_I is calculated for (X_I, Y_I)=(1,1)(1,0)(0,1)(0,0), respectively, by assigning the angle of polarization rotation $\theta$ obtained or calculated in S1 to the following equation.

$$X'\_I = X\_I \cos\theta - Y\_I \sin\theta$$

Then, the controller 30 calculates the amplitude of the drive signal X'_I according to a maximum value and a minimum value of the drive signal X'_I obtained in the above-described calculation. The amplitude of the other drive signals X'_Q, Y'_I, and Y'_Q are calculated in a similar manner.

In S3, the controller 30 calculates the gain of the amplitude equalizers 26a-26d according to the amplitude of the drive signals calculated in S2 and the optimal amplitude. In the first embodiment, the optical transmitter 10 is designed such that the amplitude of the drive signals X'_I, X'_Q, Y'_I, and Y'_Q obtained when the angle of polarization rotation $\theta$ is zero will be optimal amplitude, as described above with reference to FIG. 7A. In other words, the optimal amplitude of the drive signals X'_I, X'_Q, Y'_I, and Y'_Q is calculated in advance. Note that data indicating the optimal amplitude of drive signals is stored in a memory which is accessible to the controller 30.

For example, it is assumed that the optimal amplitude of the drive signal X'_I is "1". Moreover, it is assumed that the amplitude of the drive signal X'_I calculated from the angle of polarization rotation $\theta 1$ in S2 is "0.75". In this case, the controller 30 determines the gain of the amplitude equalizer 26a such that the amplitude of the drive signal X'_I generated for the angle of polarization rotation $\theta 1$ will be equalized or adjusted to "1". In this example, "1.33" is obtained as the gain of the amplitude equalizer 26a. The gains of the amplitude equalizers 26b-26d for the drive signals X'_Q, Y'_I, and Y'_Q are calculated in a similar manner.

In S4, the controller 30 sets the gains obtained in S3 to the amplitude equalizers 26a-26d. As a result, the amplitude of the drive signals X'_I, X'_Q, Y'_I, and Y'_Q are adjusted to an optimal value or approximately optimal value. In the above-described example, the amplitude equalizer 26a multiplies the drive signal X'_I by "1.33". As a result, the amplitude of the drive signal X'_I is adjusted to approximately "1". As described above, each of the LN modulators of the optical modulator 63 generates an optical signal with preferable drive amplitude, and thereby the quality of a transmission signal improves.

In the example of FIG. 8, the amplitude of drive signals is calculated according to the angle of polarization rotation θ in S2, and the gains of the amplitude equalizers are calculated in S3. Here, when the modulation scheme is fixed, it is possible to preliminarily calculate the gains for optimizing the amplitude of drive signals from any angle of polarization rotation θ. Accordingly, it is possible to prepare a table in which the relationship between the angle of polarization rotation θ and the gain for obtaining optimal amplitude is indicated for the drive signals X'_I, X'_Q, Y'_I, and Y'_Q (i.e., for the amplitude equalizers 26a-26d), respectively. In this case, it is possible for the controller 30 to obtain from the table the gain data corresponding to the angle of polarization rotation θ which is obtained in S1. In other words, the arithmetic processing in S2 and S3 may be replaced with the searching of the table.

In the above-described embodiment, with reference to the amplitude of drive signals at which the angle of polarization rotation θ is zero, the amplitude of drive signals of an arbitrary angle of polarization rotation is equalized or adjusted. However, the first embodiment is not limited to this configuration. In other words, the optical transmitter 10 may equalize or adjust the amplitude of drive signals of an arbitrary angle of polarization rotation with reference to, for example, the amplitude of drive signals at which the angle of polarization rotation θ is π.

Figure 9:
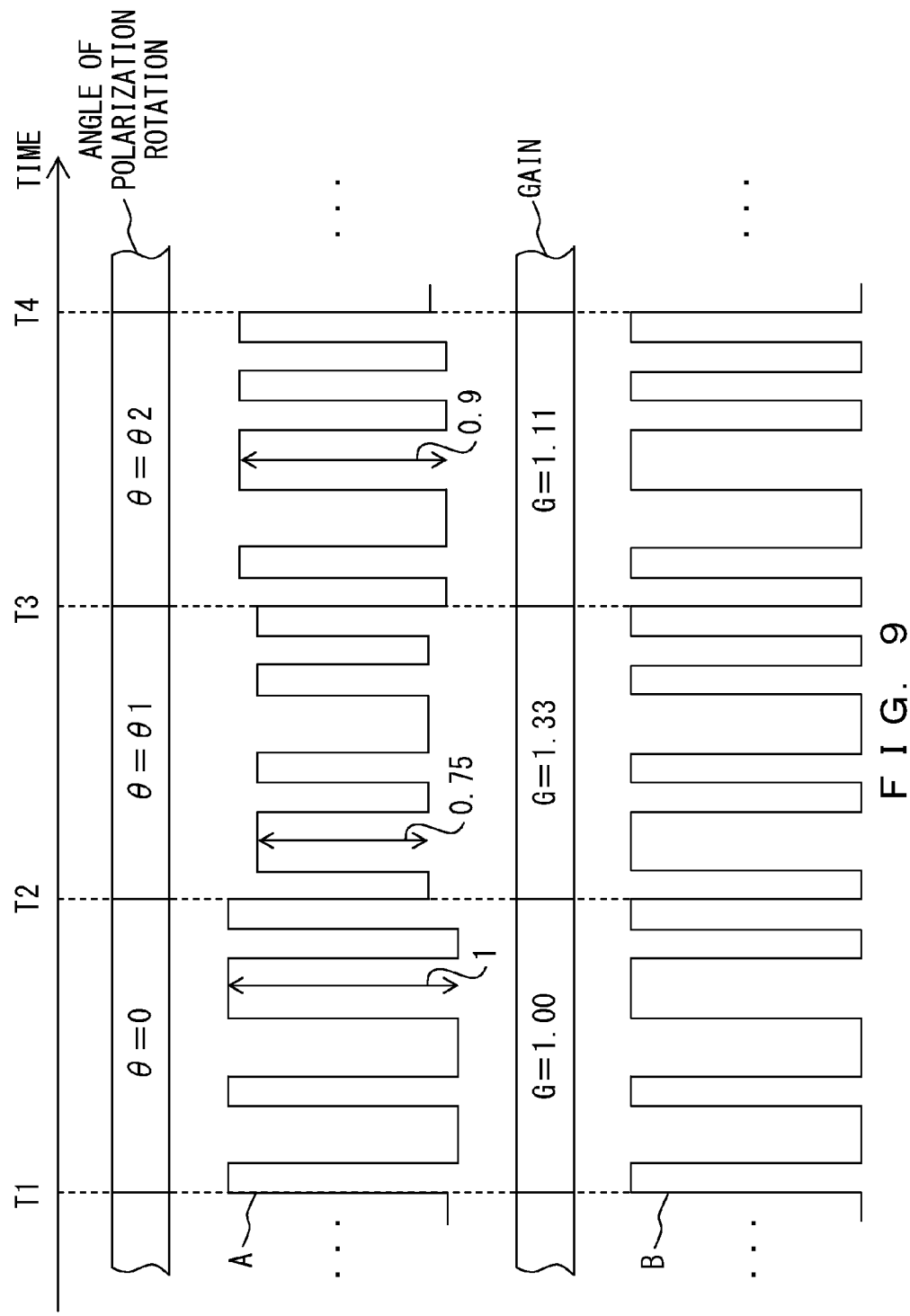
FIG. 9 is a diagram illustrating an example of the process of equalizing the amplitude of a drive signal.

FIG. 9 is a diagram illustrating an example of the process of equalizing the amplitude of the drive signal. The drive signal A represents one of X'_I, X'_Q, Y'_I, and Y'_Q which are input to the amplitude equalizers 26b-26d. Moreover, the drive signal B represents the drive signal A whose amplitude is equalized by an amplitude equalizer.

In FIG. 9, the angle of polarization rotation θ is "zero" in the period of time T1 through T2. Hereinafter, it is assumed that the amplitude of the drive signal A is "1" when the angle of polarization rotation θ is "zero". In the period of time T2 through T3, the angle of polarization rotation is controlled to "θ1" by the polarization scrambler 25, and the amplitude of the drive signal A is changed to "0.75". In the period of time T3 through T4, the angle of polarization rotation is controlled to "θ2" by the polarization scrambler 25, and the amplitude of the drive signal A is changed to "0.9".

In the period of time T1 through T2, the controller 30 controls the gain G of an amplitude equalizer to "1" according to "θ=zero". Accordingly, in the period of time T1 through T2, the amplitude of the drive signal B is the same as the amplitude of the drive signal A. Note that regarding the descriptions with respect to FIG. 9, the values indicating the gain are given only for purposes of explanation.

In the period of time T2 through T3, the controller 30 controls the gain G of an amplitude equalizer to "1.33" according to "θ=θ1". As a result, the amplitude of the drive signal B in the period of time T2 through T3 is approximately the same as the amplitude of the drive signal B in the period of time T1 through T2. In other words, the drive signal in the period of time T2 through T3 is equalized or adjusted to the optimal amplitude. Regarding a method for determining a gain G according to the angle of polarization rotation θ, refer to, for example, the descriptions provided above with respect to FIG. 8.

In the period of time T3 through T4, the controller 30 controls the gain G of an amplitude equalizer to "1.11" according to "θ=θ2". As a result, the amplitude of the drive signal B in the period of time T3 through T4 is also approximately the same as the amplitude of the drive signal B in the period of time T1 through T2. In other words, a drive signal in the period of time T3 through T4 is also equalized or adjusted to the optimal amplitude.

In the embodiment described with reference to FIGS. 6-9, the optical transmitter 10 optimizes the amplitude of drive signals by using the amplitude equalizers 26a-26d. However, the first embodiment is not limited to this configuration. In other words, the optical transmitter 10 may optimize the power of the drive signals while monitoring the angle of polarization rotation θ. In this case, the optical transmitter 10 includes power equalizers instead of the amplitude equalizers 26a-26d.

As described above, the optical transmitter 10 of the first embodiment can optimize or approximately optimize the amplitude of drive signals of an optical modulator even in a transmission scheme that the angle of polarization rotation of an optical signal is changed with respect to time. Accordingly, the quality of a transmission signal improves.

Moreover, in the optical transmitter 10, the amplitude of drive signal is changed in order to realize the polarization rotation in the digital signal processing, and the amplitude of drive signal is equalized within the digital signal processing. Thus, the optical transmitter 10 can follow high-speed fluctuations in the amplitude of drive signal due to such as the polarization rotation, and equalize the amplitude of drive signal. Accordingly, the stable characteristics of a transmission signal are achieved in the entire optical communication system.

<Second Embodiment>

In the first embodiment, the fluctuation in the amplitude of drive signals caused due to polarization rotation is compensated for. However, in the digital signal processing in which a drive signal is generated from input data, polarization rotation is not the only factor for the fluctuation in the amplitude of drive signals. For this reason, in the second embodiment, factors other than the polarization rotation are also considered in order to achieve the optimization of the amplitude of drive signals.

FIG. 10 is a diagram illustrating the operation of the optical transmitter 10 according to the second embodiment. Note that the configuration of the optical transmitter 10 is substantially the same between the first and second embodiments.

As described above, the controller 30 is notified by the control plane 100 of the modulation scheme of the optical transmitter 10 and a value of the chromatic dispersion to be compensated for in the pre-equalization. The control plane 100 is omitted in FIG. 10. The mapper 23 performs the mapping, which corresponds to the modulation scheme, according to the control of the controller 30. Moreover, the signal distortion equalizer 24 performs the pre-equalization, which corresponds to a value of chromatic dispersion, according to the control of the controller 30. Furthermore, the controller 30 obtains the angle of polarization rotation θ from the polarization scrambler 25 in a similar manner to the first embodiment.

Here, it is assumed that for the combination of the modulation scheme, a value of the chromatic dispersion, and the angle of polarization rotation θ, an optimal amplitude of the drive signals of the optical modulator 63 is calculated in advance. Further, it is assumed that an optimal power of drive signals is also calculated from the optimal amplitude of drive signals.

The controller 30 calculates the power of the drive signals X'_I, X'_Q, Y'_I, and Y'_Q by monitoring each of the signals output from the transmitter equalizers 27a-27d. Here, the controller 30 calculates the power of the drive signal X'_I, for example, by averaging the signals output from the transmitter equalizer 27a over a specified time period. The specified time period during which the averaging operation is performed is not limited, but is, for example, a time period between several symbols and several tens of symbols. Moreover, the controller 30 also calculates the power of the other drive signals X'_Q, Y'_I, and Y'_Q in a similar manner.

Further, the controller 30 calculates the gain of the amplitude equalizers 26a-26d according to preliminarily calculated optimal power of drive signals and the power obtained by averaging the signals output from the transmitter equalizers 27a-27d. At this time, the controller 30 controls the gain of the amplitude equalizers 26a-26d such that the power obtained by averaging the signals output from the transmitter equalizers 27a-27d will approach the optimal power. As a result, the amplitude of drive signals is optimized or approximately optimized.

As described above, in the second embodiment, even when the amplitude of drive signals changes due to the modulation scheme or due to the pre-equalization performed to compensate for the characteristics of the optical transmission line, the amplitude of drive signals is optimized. Accordingly, in the second embodiment, even when the modulation scheme is changed or the characteristics of the optical transmission line are reset, the quality of a transmission signal is improved.

<Third Embodiment>

Figure 11:
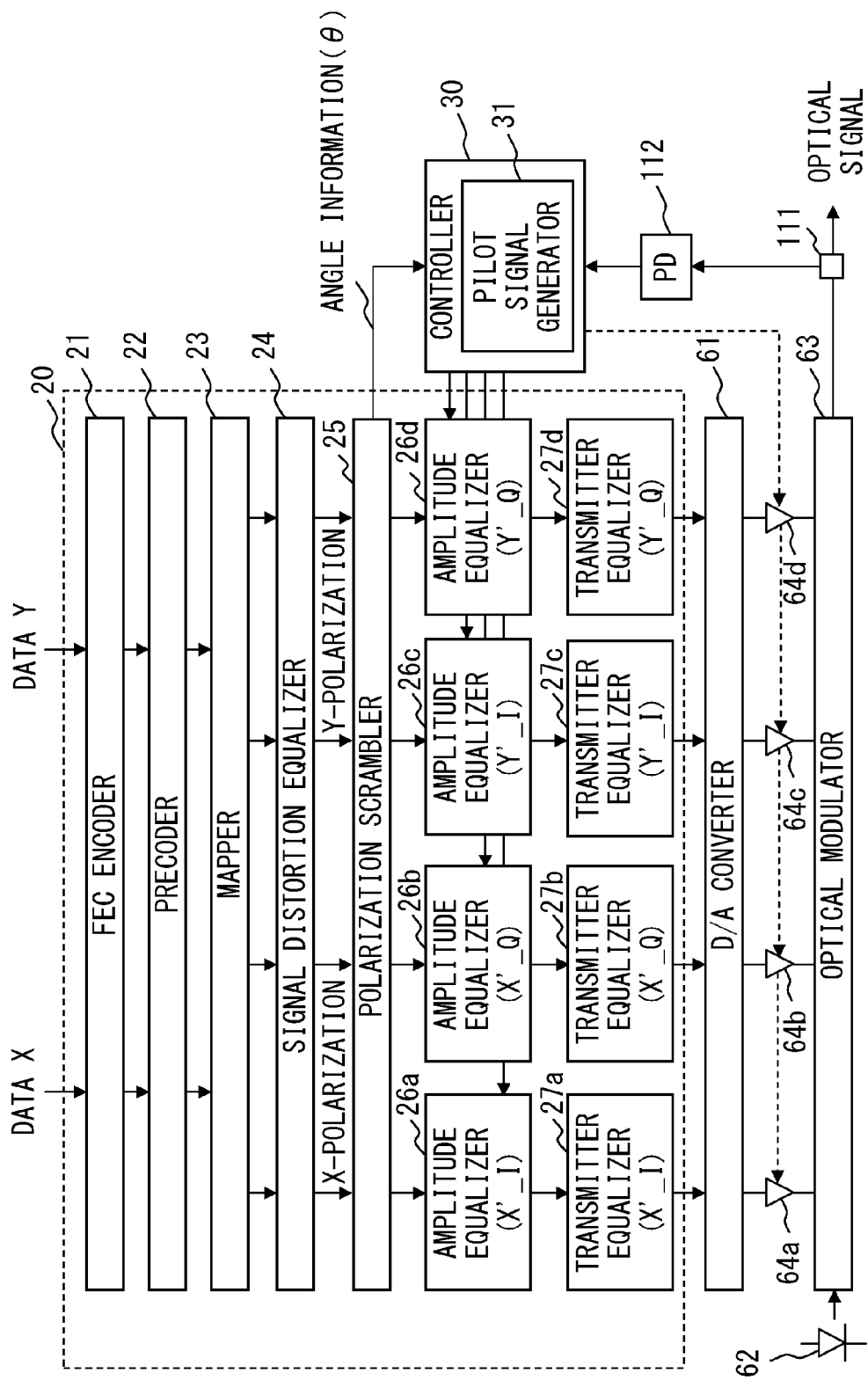
FIG. 11 is a diagram illustrating the operation of an optical transmitter according to the third embodiment.

FIG. 11 is a diagram illustrating the operation of the optical transmitter 10 according to the third embodiment. Note that the configuration of the optical transmitter 10 is substantially the same among the first to third embodiments. However, the optical transmitter of the third embodiment further includes the configuration of monitoring the output optical signal to feedback-control the amplitude of drive signals.

In FIG. 11, an optical splitter 111 splits a portion of the optical signals output from the optical modulator 63 and guides the split optical signal to a photodetector (PD) 112. The photodetector 112 includes a photodiode, and converts the optical signal output from the optical modulator 63 into electric signal. Then, the controller 30 receives the electric signal generated by the photodetector 112. In other words, the controller 30 monitors the optical signal output from the optical modulator 63. Hereinafter, the electric signal received by the controller 30 from the photodetector 112 may be referred to as a monitor signal.

In the example of FIG. 11, the photodetector 112 is arranged to receive the optical signal which is output from the optical modulator 63. However, the third embodiment is not limited to this configuration. For example, if the optical modulator 63 is configured to include a photodetector, the controller 30 may receive the monitor signal from the photodetector in the optical modulator 63.

The controller 30 includes a pilot signal generator 31. The pilot signal generator 31 generates a pilot signal with a frequency $f_0$ when the angle of polarization rotation θ is controlled to zero by the polarization scrambler 25. Here, it is assumed that the frequency $f_0$ is sufficiently slow compared with a symbol rate of data X and data Y. Moreover, it is assumed that the frequency $f_0$ is sufficiently fast compared with the cycle in which the polarization scrambler 25 changes the angle of polarization rotation θ. No limitation is indicated herein, but for example, the transmission data symbol rate may be 10G-100G symbol/s, the changing cycle of the angle of polarization rotation θ may be 1 kHz-100 kHz, and the frequency $f_0$ of a pilot signal may be 1 MHz-100 MHz. The pilot signal generator 31 is an example of an oscillation controller to control the drive signal to oscillate at a specified frequency. The pilot signal generator 31 is illustrated within the controller 30 in FIG. 11, however the pilot signal generator 31 may be provided outside the controller.

The controller 30 applies dithering to the amplitude of the drive signals of the optical modulator 63 by using the pilot signal. By so doing, the power of the optical signal output from the optical modulator 63 fluctuates at the frequency $f_0$ and/or at a frequency which is an integral multiple of the frequency $f_0$.

The controller 30 detects the $2f_0$-component in the light output from the optical modulator 63 by using the monitor signal received from the photodetector 112. In this case, a filter extracting the $2f_0$-component may be provided between the photodetector 112 and the controller 30. The controller 30 controls the amplitude equalizers 26a-26d so as to increase the $2f_0$-component. Preferably, the controller 30 controls the amplitude equalizers 26a-26d so as to maximize the $2f_0$-component.

Figure 12:
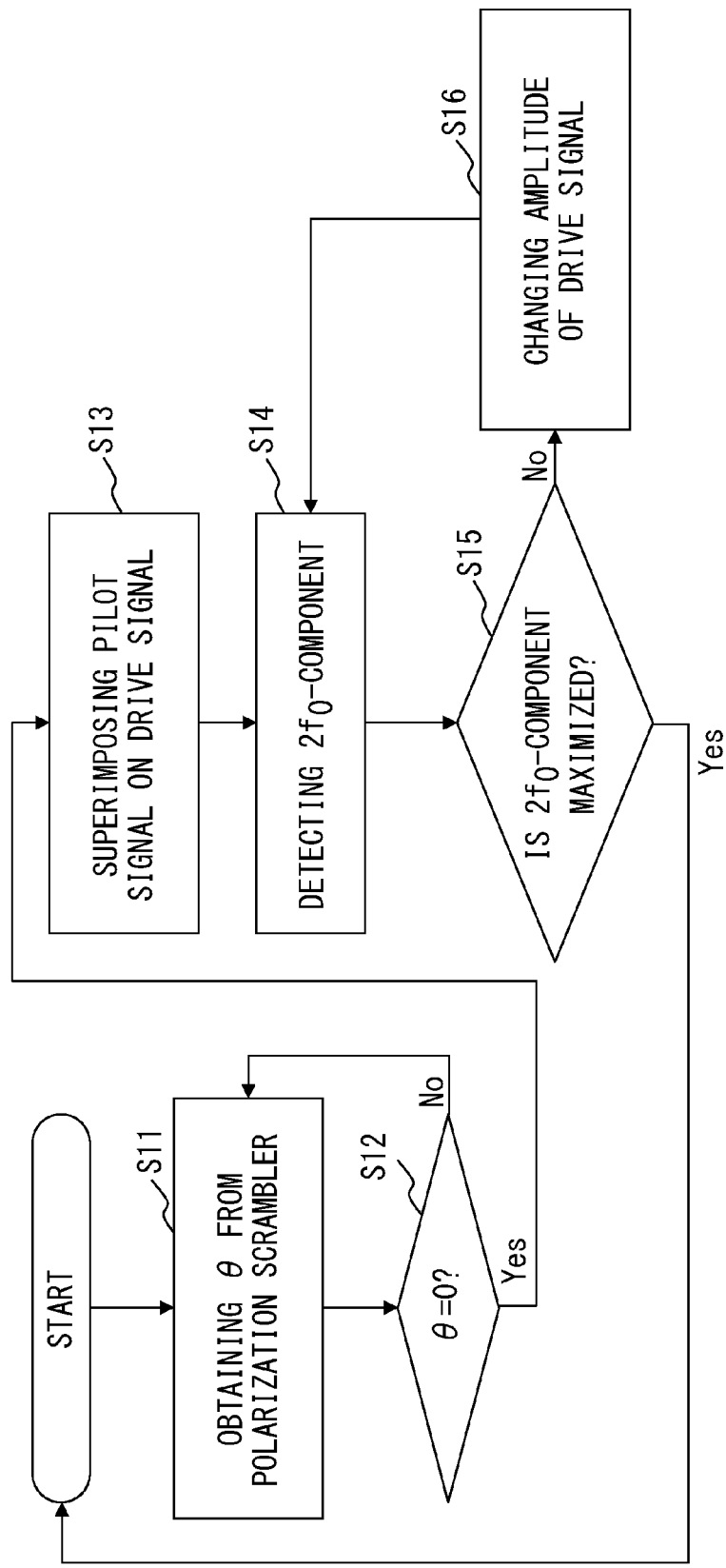
FIG. 12 is a flowchart illustrating the processes of controlling the amplitude of a drive signal according to the third embodiment.

FIG. 12 is a flowchart illustrating the processes of controlling the amplitude of the drive signal according to the third embodiment. The processes of the flowchart of FIG. 12 are performed by the controller 30 periodically. The controller 30 repeats the processes of this flowchart, for example, at time intervals shorter than the cycle in which the polarization scrambler 25 changes the angle of polarization rotation θ.

In S11 and S12, the controller 30 monitors the angle of polarization rotation θ which is given from the polarization scrambler 25. At this time, the controller 30 obtains from the polarization scrambler 25 the angle information indicating the angle of polarization rotation θ. The process of the controller 30 shifts to S13 when the angle of polarization rotation θ is zero. In other words, the controller 30 performs the processes of S13 through S16 during the period in which the angle of polarization rotation θ is zero.

Here, the drive signals X'_I, X'_Q, Y'_I, and Y'_Q of the optical modulator 63 are expressed as follows in a similar manner to the first embodiment.

$$X'\_I: X\_I \cos\theta - Y\_I \sin\theta$$

$$X'\_Q: X\_Q \cos\theta - Y\_Q \sin\theta$$

$$Y'\_I: X\_I \sin\theta + Y\_I \cos\theta$$

$$Y'\_Q: X\_Q \sin\theta + Y\_Q \cos\theta \quad (4)$$

Accordingly, when the angle of polarization rotation 0 is zero, the drive signals X'_I, X'_Q, Y'_I, and Y'_Q are expressed as follows.

$$X'\_I = X\_I$$

$$X'\_Q = X\_Q$$

$$Y'\_I = Y\_I$$

$$Y'\_Q = Y\_Q$$

In other words, when the angle of polarization rotation θ is zero, the drive signals X'_I and X'_Q are not influenced by the data Y, and the drive signals Y'_I and Y'_Q are not influenced by the data X. Accordingly, when the angle of polarization rotation θ is zero, each of the drive signals X'_I, X'_Q, Y'_I, and Y'_Q has an optimal amplitude.

Also, as is apparent from equation (4) above, when the angle of polarization rotation θ is π, the drive signals X'_I and X'_Q are not influenced by the data Y, and the drive signals Y'_I and Y'_Q are not influenced by the data X. Accordingly, the controller 30 may perform the processes of S13-S16 during the period in which the angle of polarization rotation θ is π.

In S13-S16, the controller 30 adjusts or optimizes the amplitude of drive signals. Here, the processes of S13-S16 are performed for the drive signals X'_I, X'_Q, Y'_I, and Y'_Q, respectively. For example, the controller 30 sequentially performs the processes of S13-S16 for drive signals X'_I, X'_Q, Y'_I, and Y'_Q. Hereinafter, the operation in which the amplitude of the drive signal X'_I is optimized will be described.

In S13, the controller 30 superimposes the pilot signal on the drive signal X'_I. For example, the controller 30 instructs the amplitude equalizer 26a to oscillate the gain at the frequency $f_0$. By doing this, the pilot signal is superimposed on the drive signal X'_I by the amplitude equalizer 26a. Alternatively, the controller 30 may instruct the amplifier 64a to oscillate the gain at the frequency $f_0$. In this case, the pilot signal is superimposed on the drive signal X'_I by the amplifier 64a.

FIG. 13 is a diagram illustrating the operation of an LN modulator where an optical signal is generated by a drive signal on which a pilot signal is superimposed. Note that in FIG. 13, the amplitude of drive signal is optimized to $2V\pi$. Moreover, it is assumed that the bias of the LN modulator is also optimized. In this case, when the pilot signal is superimposed on the drive signal, the light output from the LN modulator will include the $2f_0$-component. In other words, when the light output from the LN modulator includes the $2f_0$-component, it is determined that the amplitude of the drive signal has been optimized or approximately optimized to an optimal value.

On the other hand, when the amplitude of the drive signal deviates from the optimal value, as illustrated in FIGS. 14A and 14B, the light output from the LN modulator does not include the $2f_0$-component. Note that FIG. 14A illustrates a state in which the amplitude of the drive signal is larger than the optimal value, and FIG. 14B illustrates a state in which the amplitude of the drive signal is smaller than the optimal value. When the amplitude of the drive signal deviates from the optimal value, the light output from the LN modulator will include the $f_0$-component. However, when the case in which the amplitude of the drive signal is larger than the optimal value is compared with the case in which the amplitude of the drive signal is smaller than the optimal value, the phases of the $f_0$-component signal are inverted from each other.

FIG. 12 will be described again. In S14-S15, the controller 30 performs synchronous detection to detect the $2f_0$-component in the light output from the optical modulator 63 by using the monitor signal received from the photodetector 112. Then, in S16, the controller 30 instructs the amplitude equalizer 26a to control the gain so as to increase or maximize the $2f_0$-component. As a result, the amplitude of the drive signal X'_I changes, and the $2f_0$-component extracted from the light output from the LN modulator also changes.

The controller 30 repeats the processes of S14-S16 until the $2f_0$-component reaches a specified maximum value (or until the $2f_0$-component becomes larger than a specified threshold). When the $2f_0$-component reaches the maximum value, the controller 30 finishes the adjustment of the amplitude of the drive signal X'_I. Subsequently, the controller 30 also adjusts the drive signals X'_Q, Y'_I, and Y'_Q in a similar manner.

Due to the procedure described above, the amplitude of the drive signals X'_I, X'_Q, Y'_I, and Y'_Q is optimized or approximately optimized. As a result, the quality of a transmission signal improves.

In the example of FIG. 12, the amplitude of the drive signals X'_I, X'_Q, Y'_I, and Y'_Q is adjusted in turn by a time division scheme. However, the third embodiment is not limited to this method. For example, the controller 30 may adjust the amplitude of the drive signals X'_I, X'_Q, Y'_I, and Y'_Q, in parallel. In this case, the controller 30 adjusts the amplitude of the drive signals X'_I, X'_Q, Y'_I, and Y'_Q, for example, by using pilot signals which each have a different frequency.

In the method described with reference to FIGS. 13, 14A and 14B, the amplitude of drive signals is controlled to oscillate at the frequency $f_0$. However, the third embodiment is not limited to this method. For example, the controller 30 may control the bias voltage such that the operating point of an LN modulator will oscillate at the frequency $f_0$.

In the example of FIG. 12, the controller 30 adjusts the amplitude of the drive signal by using the $2f_0$-component. However, the third embodiment is not limited to this method. In other words, the controller 30 may adjust the amplitude of the drive signal, for example, by using the $f_0$-component. In this case, the controller 30 adjusts the amplitude of the drive signal such that the $f_0$-component will be reduced to zero (or such that the $f_0$-component will be smaller than a specified threshold).

Note that the operation of adjusting the amplitude of the drive signal by using the pilot signal as well as the operation of adjusting the bias of the optical modulator 63 may be realized with almost the same control scheme. Accordingly, if these two operations are performed by the same control system, it is possible to realize the adjustment of the amplitude of the drive signal without increasing the circuit size of the optical transmitter 10.

<Other Embodiments>

The above-described first to third embodiments may be arbitrarily combined. For example, before an optical signal is transmitted in the method of the first or second embodiment, the amplitude of the drive signals may be optimized in a reference condition (i.e., the state in which the angle of polarization rotation θ is zero) by using the method of the third embodiment.

In the descriptions above, the optical transmitter 10 transmits a polarization multiplexed optical signal, but the present invention is not limited to this configuration. The optical transmitter 10 may transmit an optical signal by using a single polarization.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. An optical transmitter, comprising:
   a digital signal processor configured to generate a drive signal from input data;
   a controller configured to equalize an amplitude or power of the drive signal by controlling the amplitude or power of the drive signal to be substantially constant at a specified amplitude or power according to information relating to the digital signal processing of the digital signal processor; and
   an optical modulator configured to modulate input light with the drive signal equalized by the controller to generate an optical signal, wherein
   the digital signal processor includes a polarization scrambler to apply polarization rotation to the drive signal, and
   the controller equalizes the amplitude or power of the drive signal according to an angle of polarization rotation applied by the polarization scrambler.

2. The optical transmitter according to claim 1, wherein the controller equalizes the amplitude or power of the drive signal with reference to amplitude or power of the drive signal at which an angle of polarization rotation applied by the polarization scrambler is zero.

3. An optical transmitter, comprising:
a digital signal processor configured to generate a drive signal from input data;
a controller configured to equalize an amplitude or power of the drive signal by controlling the amplitude or power of the drive signal to be substantially constant at a specified amplitude or power according to information relating to the digital signal processing of the digital signal processor; and
an optical modulator configured to modulate input light with the drive signal equalized by the controller to generate an optical signal, wherein
the digital signal processor includes a mapper to generate the drive signal from the input data according to a specified modulation scheme, and
the controller equalizes the amplitude or power of the drive signal according to the modulation scheme.

4. An optical transmitter, comprising:
a digital signal processor configured to generate a drive signal from input data;
a controller configured to equalize an amplitude or power of the drive signal by controlling the amplitude or power of the drive signal to be substantially constant at a specified amplitude or power according to information relating to the digital signal processing of the digital signal processor; and
an optical modulator configured to modulate input light with the drive signal equalized by the controller to generate an optical signal, wherein
the digital signal processor includes a distortion equalizer to apply distortion to the drive signal to compensate for chromatic dispersion of an optical transmission line for transmitting the optical signal, and
the controller equalizes the amplitude or power of the drive signal according to the chromatic dispersion of the optical transmission line.

5. The optical transmitter according claim 1, wherein the controller equalizes the amplitude of the drive signal to a specified amplitude with which the optical modulator operates in an optimal state.

6. The optical transmitter according to claim 1, wherein the optical transmitter receives instruction information which provides an instruction for the digital signal processing,
the digital signal processor generates the drive signal from the input data according to the instruction information, and
the controller equalizes the amplitude or power of the drive signal according to the instruction information.

7. The optical transmitter according to claim 1,
further comprising an oscillation controller to configured the drive signal to oscillate at a specified frequency,
wherein
the digital signal processor includes a polarization scrambler to apply polarization rotation to the drive signal, and
when an angle of polarization rotation applied by the polarization scrambler is zero or $\pi$, the controller equalizes the amplitude or power of the drive signal according to a component of the specified frequency or a component of a frequency which is an integral multiple of the specified frequency included in the optical signal output from the optical modulator.

8. The optical transmitter according to claim 7, wherein when an angle of polarization rotation applied by the polarization scrambler is zero or $\pi$, the controller equalizes the amplitude or power of the drive signal so as to maximize the component of a frequency which is twice the specified frequency included in the optical signal output from the optical modulator.

9. An optical transmission method, comprising:
generating a drive signal from input data and performing polarization scrambling to apply polarization rotation to the drive signal in digital signal processing;
equalizing an amplitude or power of the drive signal by controlling the amplitude or power of the drive signal to be substantially constant at a specified amplitude or power according to information relating to the digital signal processing; and
modulating an input light with the equalized drive signal to generate an optical signal,
wherein the amplitude or power of the drive signal is equalized according to an angle of polarization rotation by the polarization scrambling.

* * * * *